US010480247B2

(12) United States Patent
Theesen

(10) Patent No.: US 10,480,247 B2
(45) Date of Patent: Nov. 19, 2019

(54) COMBINED MULTI-COUPLER WITH ROTATING FIXATIONS FOR TOP DRIVE

(71) Applicant: Weatherford Technology Holdings, LLC, Houston, TX (US)

(72) Inventor: Folke Theesen, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 142 days.

(21) Appl. No.: 15/447,926

(22) Filed: Mar. 2, 2017

(65) Prior Publication Data

US 2018/0252269 A1 Sep. 6, 2018

(51) Int. Cl.
| | | |
|---|---|---|
| E21B 17/02 | (2006.01) |
| E21B 3/02 | (2006.01) |
| E21B 17/03 | (2006.01) |
| E21B 17/06 | (2006.01) |
| F16D 1/116 | (2006.01) |

(52) U.S. Cl.
CPC ............... *E21B 3/02* (2013.01); *E21B 17/03* (2013.01); *E21B 17/06* (2013.01); *F16D 1/116* (2013.01)

(58) Field of Classification Search
CPC . E21B 19/16; E21B 3/02; E21B 17/02; E21B 19/08; E21B 3/025; E21B 3/03; E21B 3/035

See application file for complete search history.

(56) References Cited

U.S. PATENT DOCUMENTS

| 1,367,156 A | 2/1921 | McAlvay et al. |
| 1,610,977 A | 12/1926 | Scott |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,467,202 A * | 9/1969 | Brown ............... E21B 3/02 173/197 |
| 3,662,842 A | 5/1972 | Bromell |
| 3,698,426 A | 10/1972 | Litchfield et al. |
| 3,747,675 A | 7/1973 | Brown |

(Continued)

FOREIGN PATENT DOCUMENTS

| AU | 2012201644 A1 | 4/2012 |
| AU | 2013205714 A1 | 5/2013 |

(Continued)

OTHER PUBLICATIONS

EPO Extended European Search Report dated Feb. 18, 2019, for European Application No. 18159598.4.

(Continued)

*Primary Examiner* — Kipp C Wallace
(74) *Attorney, Agent, or Firm* — Patterson + Sheridan, LLP

(57) ABSTRACT

A method and system for coupling a drive unit to a tool adapter includes joining a first plate to a second plate; stabbing a stabbing member of the first plate into a hollow of the second plate; and rotating a bar of the second plate from an open position to a closed position to secure the stabbing member in the hollow. An embodiment includes positioning the tool adapter below the drive unit; stabbing a coupling head into a coupling recess; moving a fixation ring vertically; and securing bolts of the drive unit in notches of the coupling head.

19 Claims, 23 Drawing Sheets

(56) References Cited

U.S. PATENT DOCUMENTS

| | | |
|---|---|---|
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,406,324 A | 9/1983 | Baugh et al. |
| 4,449,596 A | 5/1984 | Boyadjieff |
| 4,474,088 A * | 10/1984 | Lee .................. E21B 19/16 81/57.18 |
| 4,478,244 A | 10/1984 | Garrett |
| 4,497,224 A | 2/1985 | Jurgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,050,691 A * | 9/1991 | Moses .................. E21B 17/043 166/77.51 |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,228,525 A * | 7/1993 | Denney .................. E21B 19/08 173/154 |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |

(56) References Cited

U.S. PATENT DOCUMENTS

| | | |
|---|---|---|
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0057029 A1* | 3/2009 | Williams ............... E21B 17/02 175/214 |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietas |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0050522 A1 | 2/2014 | Slaughter, Jr. et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |

(56) References Cited

U.S. PATENT DOCUMENTS

| | | | |
|---|---|---|---|
| 2014/0352944 A1 | 12/2014 | Devarajan et al. | |
| 2014/0360780 A1 | 12/2014 | Moss et al. | |
| 2015/0014063 A1 | 1/2015 | Simanjuntak et al. | |
| 2015/0053424 A1 | 2/2015 | Wiens et al. | |
| 2015/0083391 A1 | 3/2015 | Bangert et al. | |
| 2015/0107385 A1 | 4/2015 | Mullins et al. | |
| 2015/0337648 A1 | 11/2015 | Zippel et al. | |
| 2016/0024862 A1 | 1/2016 | Wilson et al. | |
| 2016/0138348 A1 | 5/2016 | Kunec | |
| 2016/0145954 A1 | 5/2016 | Helms et al. | |
| 2016/0177639 A1 | 6/2016 | McIntosh et al. | |
| 2016/0215592 A1 | 7/2016 | Helms et al. | |
| 2016/0230481 A1 | 8/2016 | Misson et al. | |
| 2016/0362941 A1* | 12/2016 | Deel | E21B 17/03 |
| 2016/0362943 A1* | 12/2016 | Malstam | E21B 3/02 |
| 2017/0037683 A1 | 2/2017 | Heidecke et al. | |
| 2017/0044854 A1 | 2/2017 | Hebebrand et al. | |
| 2017/0044875 A1 | 2/2017 | Hebebrand et al. | |
| 2017/0051568 A1 | 2/2017 | Wern et al. | |
| 2017/0067303 A1 | 3/2017 | Thiemann et al. | |
| 2017/0067320 A1 | 3/2017 | Zouhair et al. | |
| 2017/0074075 A1 | 3/2017 | Liess | |
| 2017/0159360 A1* | 6/2017 | Netecke | E21B 3/02 |
| 2017/0211327 A1 | 7/2017 | Wern et al. | |
| 2017/0211343 A1 | 7/2017 | Thiemann | |
| 2017/0284164 A1 | 10/2017 | Holmes et al. | |

FOREIGN PATENT DOCUMENTS

| | | |
|---|---|---|
| AU | 2014215938 A1 | 9/2014 |
| AU | 2015234310 A1 | 10/2015 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1961912 A1 | 8/2008 |
| EP | 1961913 A1 | 8/2008 |
| EP | 2085566 A2 | 8/2009 |
| EP | 2 322 357 A1 | 5/2011 |
| EP | 2808483 A2 | 12/2014 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

A123 System; 14Ah Prismatic Pouch Cell; Nanophosphate® Lithium-Ion; www.a123systems.com; date unknown; 1 page.

Streicher Load/Torque Cell Systems; date unknown; 1 page.

3PS, Inc.; Enhanced Torque and Tension Sub with Integrated Turns; date unknown; 2 total pages.

Lefevre, et al.; Drilling Technology; Deeper, more deviated wells push development of smart drill stem rotary shouldered connections; dated 2008; 2 total pages.

PCT Invitaiton to Pay Additional Fees for International Application No. PCT/US2008/086699; dated Sep. 9, 2009; 7 total pages.

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

European Search Report for Application No. 08 860 261.0-2315; dated Apr. 12, 2011; 4 total pages.

Eaton; Spool Valve Hydraulic Motors; dated Sep. 2011; 16 total pages.

European Extended Search Report for Application No. 12153779.9-2315; dated Apr. 5, 2012; 4 total pages.

Australian Examination Report for Application No. 2012201644; dated May 15, 2013; 3 total pages.

Warrior; 250E Electric Top Drive (250-TON); 250H Hydraulic Top Drive (250-TON); dated Apr. 2014; 4 total pages.

Hydraulic Pumps & Motors; Fundamentals of Hydraulic Motors; dated Jun. 26, 2014; 6 total pages.

Warrior; Move Pipe Better; 500E Electric Top Drive (500 ton-1000 hp); dated May 2015; 4 total pages.

Canadian Office Action for Application No. 2,837,581; dated Aug. 24, 2015; 3 total pages.

European Extended Search Report for Application No. 15166062.8-1610; dated Nov. 23, 2015; 6 total pages.

Australian Examination Report for Application No. 2014215938; dated Feb. 4, 2016; 3 total pages.

Rexroth; Bosch Group; Motors and Gearboxes; Asynchronous high-speed motors 1 MB for high speeds; dated Apr. 13, 2016; 6 total pages.

Canadian Office Action for Application No. 2,837,581; dated Apr. 25, 2016; 3 total pages.

PCT Notification of Transmittal of the International Search Report and the Written Opinion of the International Searching Authority for International Application No. PCT/US2015/061960; dated Jul. 25, 2016; 16 total pages.

PCT Notification of Transmittal of the International Search Report and the Written Opinion of the International Searching Authority for International Application No. PCT/US2016/049462; dated Nov. 22, 2016; 14 total pages.

PCT Notification of Transmittal of the International Search Report and the Written Opinion of the International Searching Authority for International Application No. PCT/US2016/050542; dated Nov. 25, 2016; 13 total pages.

PCT Notification of Transmittal of the International Search Report and the Written Opinion of the International Searching Authority for International Application No. PCT/US2016/046458; dated Dec. 14, 2016; 16 total pages.

PCT Notification of Transmittal of the International Search Report and the Written Opinion of the International Searching Authority for International Application No. PCT/US2016/047813; dated Jan. 12, 2017; 15 total pages.

PCT Notification of Transmittal of the International Search Report and the Written Opinion of the International Searching Authority for International Application No. PCT/US2016/050139; dated Feb. 20, 2017; 20 total pages.

PCT Notification of Transmittal of the International Search Report and the Written Opinion of the International Searching Authority for International Application No. PCT/US2017/014646; dated Apr. 4, 2017; 14 total pages.

PCT Notification of Transmittal of the International Search Report and the Written Opinion of the International Searching Authority for International Application No. PCT/US2017/014224; dated Jun. 8, 2017; 15 total pages.

(56) References Cited

OTHER PUBLICATIONS

European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoiILOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. No. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).
EPO Partial European Search Report dated Jul. 31, 2018, for European Application No. 18159597.6.
EPO Partial European Search Report dated Oct. 4, 2018, for European Patent Application No. 18159598.4.
European Patent Office; Extended Search Report for Application No. 18160808.4; dated Sep. 20, 2018; 8 total pages.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.

* cited by examiner

COMBINED MULTI-COUPLER WITH ROTATING FIXATIONS FOR TOP DRIVE

BACKGROUND OF THE INVENTION

Embodiments of the present invention generally relate to equipment and methods for coupling a top drive to one or more tools. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with threaded connections. Such threaded connections are capable of transferring load. Right-hand (RH) threaded connections are also capable of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

Safer, faster, more reliable, and more efficient connections that are capable of conveying load, data, signals, power and/or bi-directional torque between the tool string and the top drive are needed.

SUMMARY OF THE INVENTION

The present invention generally relate to equipment and methods for coupling a top drive to one or more tools. The coupling may transfer both axial load and torque bi-directionally from the top drive to the one or more tools.

In an embodiment a coupling system of a top drive system includes a first plate comprising a stabbing member that is perpendicular to the first plate; and a second plate comprising: a hollow complementary to the stabbing member; a bore in the second plate; a bar that is rotatable within the bore between an open position and a closed position; and a securing member that secures the stabbing member in the hollow when the first plate is joined to the second plate and the bar is in the closed position. In one embodiment, the bore is parallel to the second plate.

In an embodiment a method of coupling a drive unit to a tool adapter includes joining a first plate to a second plate; stabbing a stabbing member of the first plate into a hollow of the second plate; and rotating a bar in a bore of the second plate from an open position to a closed position to secure the stabbing member in the hollow.

In an embodiment a coupling system includes a drive unit comprising: a drive stem having a coupling recess; a plurality of bolts in ports of the drive stem, wherein the bolts can move radially relative to a central bore of the drive stem; and a fixation ring encircling the drive stem and in contact with exterior ends of the bolts, wherein the fixation ring can move vertically relative to the drive stem; and a tool adapter comprising a coupling head having at least as many notches as the bolts.

In an embodiment a method of coupling a drive unit to a tool adapter includes positioning the tool adapter below the drive unit; stabbing a coupling head of the tool adapter into a coupling recess of a drive stem of the drive unit; moving a fixation ring vertically relative to the drive stem; and securing bolts of the drive unit in notches of the coupling head.

In an embodiment a coupling system between a drive unit and a tool adapter includes a coupling profile; a coupling recess complementary to the coupling profile, wherein engagement of the coupling profile with the coupling recess transfers axial load between the drive unit and the tool adapter; and a blocking mechanism, wherein engagement of the blocking mechanism with the coupling profile and the coupling recess transfers bi-directional torque between the drive unit and the tool adapter.

In an embodiment a method of coupling a drive unit to a tool adapter includes stabbing a coupling profile into a coupling recess; rotating the coupling profile relative to the coupling recess in a first direction to form a load coupling; and after forming the load coupling, blocking rotation of the coupling profile relative to the coupling recess in a direction opposite the first direction to form a torque coupling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides equipment and methods for coupling a top drive to one or more tools. The coupling may transfer torque bi-directionally from the top drive to the one or more tools. The coupling may provide mechanical, electrical, optical, hydraulic, and/or pneumatic connections. The coupling may convey torque, load, data, signals, and/or power. For example, axial loads of tool strings may be expected to be several hundred tons, up to, including, and sometimes surpassing 750 tons. Required torque transmission may be tens of thousands of foot-pounds, up to, including, and sometimes surpassing 100 thousand foot-pounds. Embodiments disclosed herein may provide axial connection integrity, capable to support high axial loads, good sealability, resistance to bending, high flow rates, and high flow pressures.

Some of the many benefits provided by embodiments of this disclosure include a reliable method to transfer full bi-directional torque, thereby reducing the risk of accidental breakout of threaded connections along the tool string. Embodiments of this disclosure also provide a fast, hands-free method to connect and transfer power from the drive unit to the tool adapter. Embodiments may provide automatic connection for power and data communications. Embodiments may provide quick tool change including many connection ports for fluid and data transmission. Embodiments also provide axial load and torque transfer mechanisms necessary for oil rig operations. The connection process may be hands free and/or faster than the conventional tool changeover methods for top drives.

Figure 1:
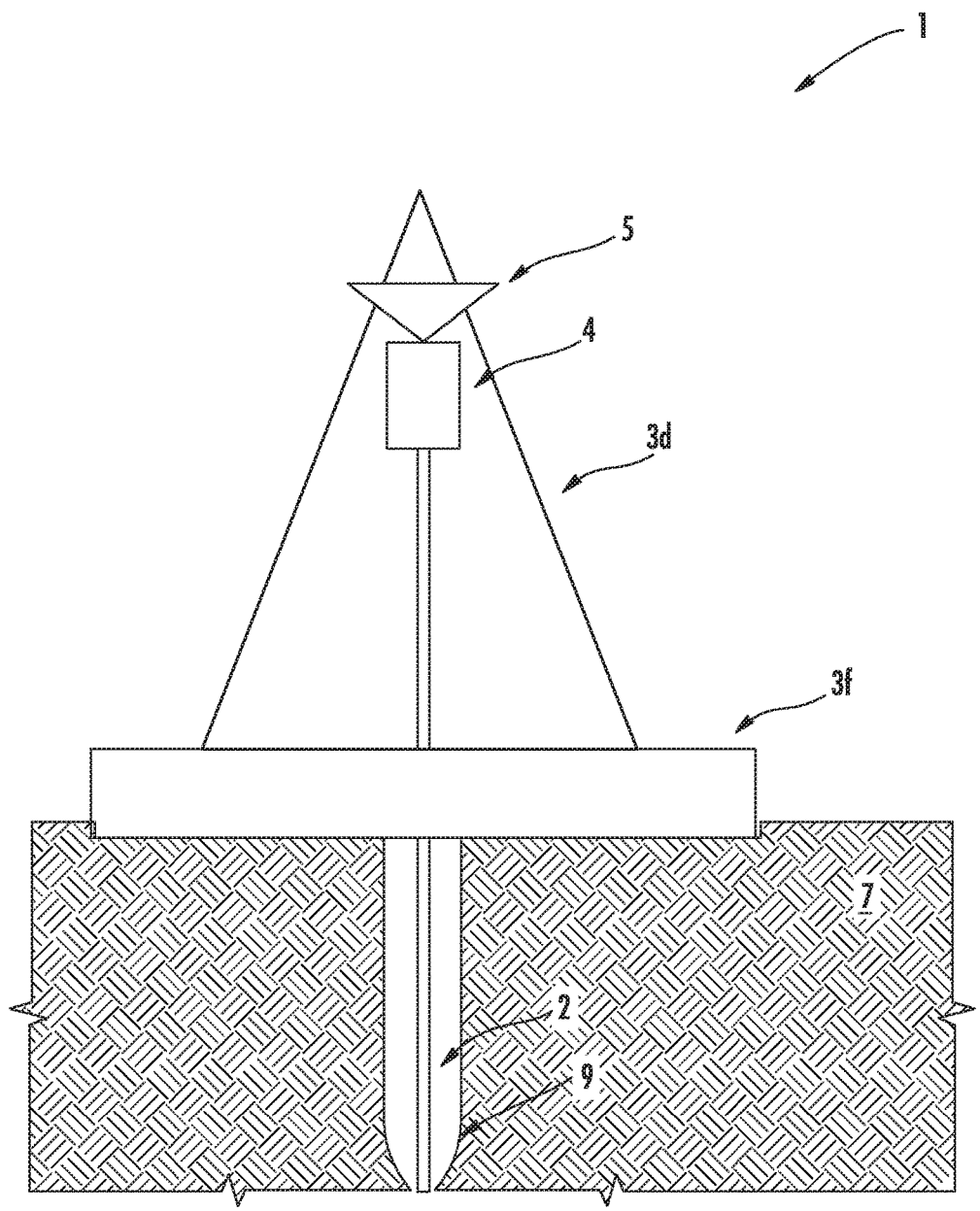
FIG. 1 illustrates a drilling system, according to embodiments of the present disclosure.

FIG. 1 illustrates a drilling system 1, according to embodiments of the present disclosure. The drilling system 1 may include a drilling rig derrick 3d on a drilling rig floor 3f. As illustrated, drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by threaded couplings. The top drive 4 may be connected to a tool string 2. At various times, top drive 4 may support the axial load of tool string 2. In some embodiments, the top drive 4 may be connected to the tool string 2 by threaded couplings. The rig floor 3f may have an opening through which the tool string 2 extends downwardly into a wellbore 9. At various times, rig floor 3f may support the axial load of tool string 2. During operation, top drive 4 may provide torque to tool string 2, for example to operate a drilling bit near the bottom of the wellbore 9. The tool string 2 may include joints of drill pipe connected together, such as by threaded couplings.

At various times, top drive 4 may provide right hand (RH) torque or left hand (LH) torque to tool string 2, for example to make up or break out joints of drill pipe. Power and/or signals may be communicated between top drive 4 and tool string 2. For example, pneumatic, hydraulic, electrical, optical, or other power and/or signals may be communicated between top drive 4 and tool string 2. The top drive 4 may include a control unit, a drive unit, and a tool adapter. In some embodiments, the tool adapter may utilize threaded connections. In some embodiments, the tool adapter may be a combined multi-coupler (CMC) or quick connector to support load and transfer torque with couplings to transfer power (hydraulic, electric, data, and/or pneumatic).

Figure 2:
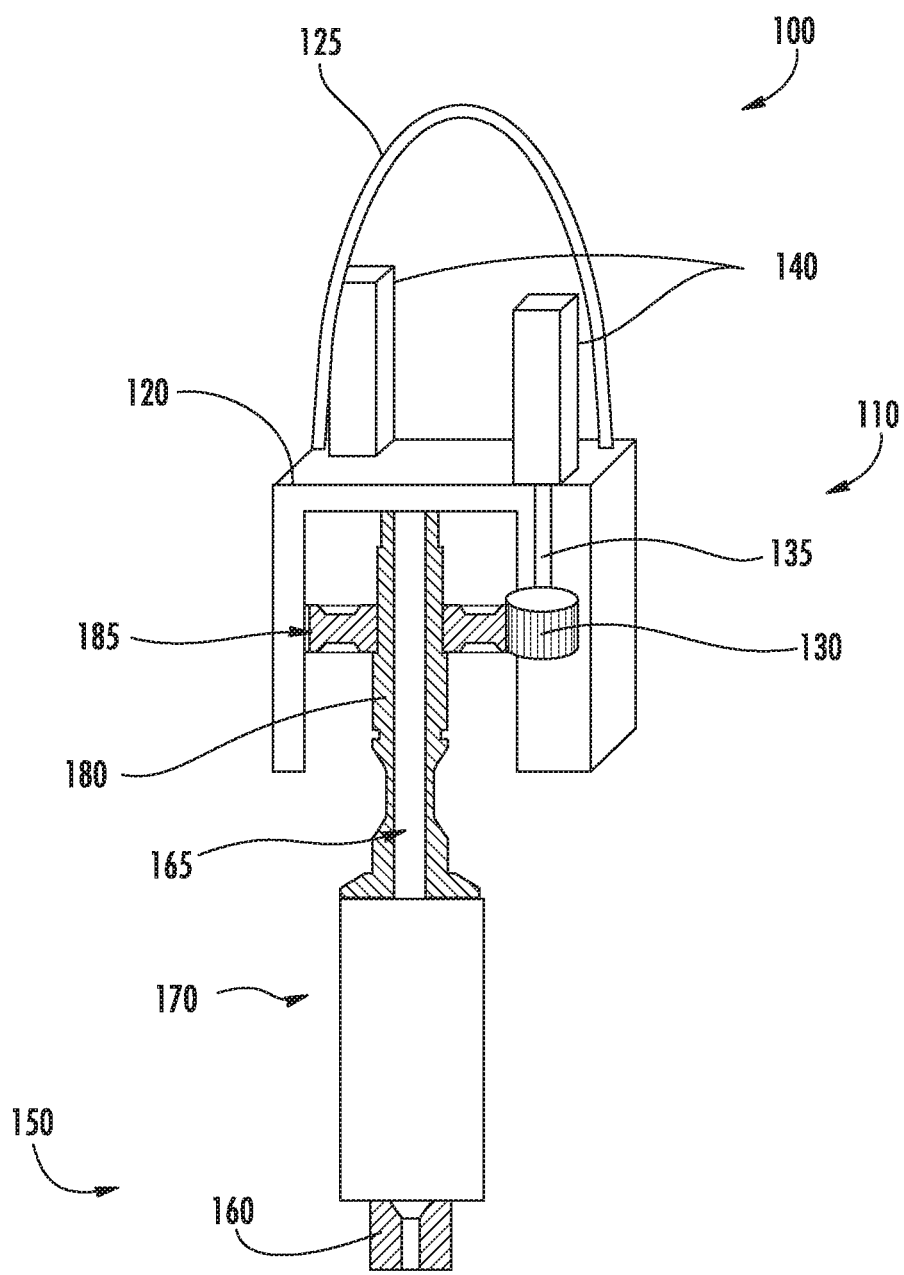
FIG. 2 illustrates a top drive system of the drilling system of FIG. 1.

FIG. 2 illustrates a top drive system 100 (e.g., top drive 4 in FIG. 1) according to embodiments described herein. Generally, top drive system 100 includes a drive unit 110 and a tool adapter 150. The drive unit 110 generally includes a housing 120, becket 125, drive gears 130, motors 140 (e.g., electric or hydraulic motors), first portions of a coupling system 170, and a drive stem 180. Becket 125 may convey load from the top drive system 100 to the hoist 5. Becket 125 may be used with, or replaced by, other load-transfer components. Drive gears 130 may couple to motors 140 by way of shaft 135. Drive gears 130 may convey torque between the motors 140 and the drive stem 180. Drive gears 130 may engage drive stem 180 at drive gear profile 185. Motors 140 may turn shaft 135, which turns drive gears 130, thereby turning drive gear profile 185 and drive stem 180. Drive gear profile 185 may have teeth designed to mesh with the gearing of drive gears 130. Alternatively, drive gears 130 and/or drive gear profile 185 may be configured to engage belt drive, chain drive, or other systems that are capable of conveying rotation. Drive gear profile 185 may be located near the top of drive stem 180. As illustrated, top drive system 100 includes two drive gears 130 (only one shown in FIG. 2) and two motors 140. Any number of drive gears 130 and/or motors 140 may be considered to accommodate manufacturing and operational conditions. The motors may be fixed to the housing 120. The tool adapter 150 generally includes a tool stem 160 and second portions of the coupling system 170. Coupling system 170 may include complementary components disposed in or on drive unit 110 and tool adapter 150. Coupling system 170 may include, for example, load couplings (e.g., axial load couplings), torque couplings (e.g., bi-directional torque couplings), and auxiliary couplings (e.g., hydraulic couplings, pneumatic couplings, electronic couplings, fiber optic couplings, power couplings, data couplings, and/or signal couplings). The tool stem 160 generally remains below the drive unit 110. (It should be understood that "below", "above", "vertically", "up", "down", and similar terms as used herein refer to the general orientation of top drive 4 as illustrated in FIG. 1. In some instances, the orientation may vary somewhat, in response to various operational conditions. In any instance wherein the central axis of the top drive system is not aligned precisely with the direction of gravitational force, "below", "above", "vertically", "up", "down", and similar terms should be understood to be along the central axis of the top drive system.) The tool stem 160 connects the top drive system 100 to the tool string 2. The tool stem 160 and drive stem 180 may share a central bore 165 (e.g. providing fluid communication through the top drive system 100 to the tool string 2). When the drive unit 110 is coupled to the tool adapter 150, top drive system 100 may transfer bi-directional torque, load, power, data, and/or signals between the top drive and the tool.

Figure 3:
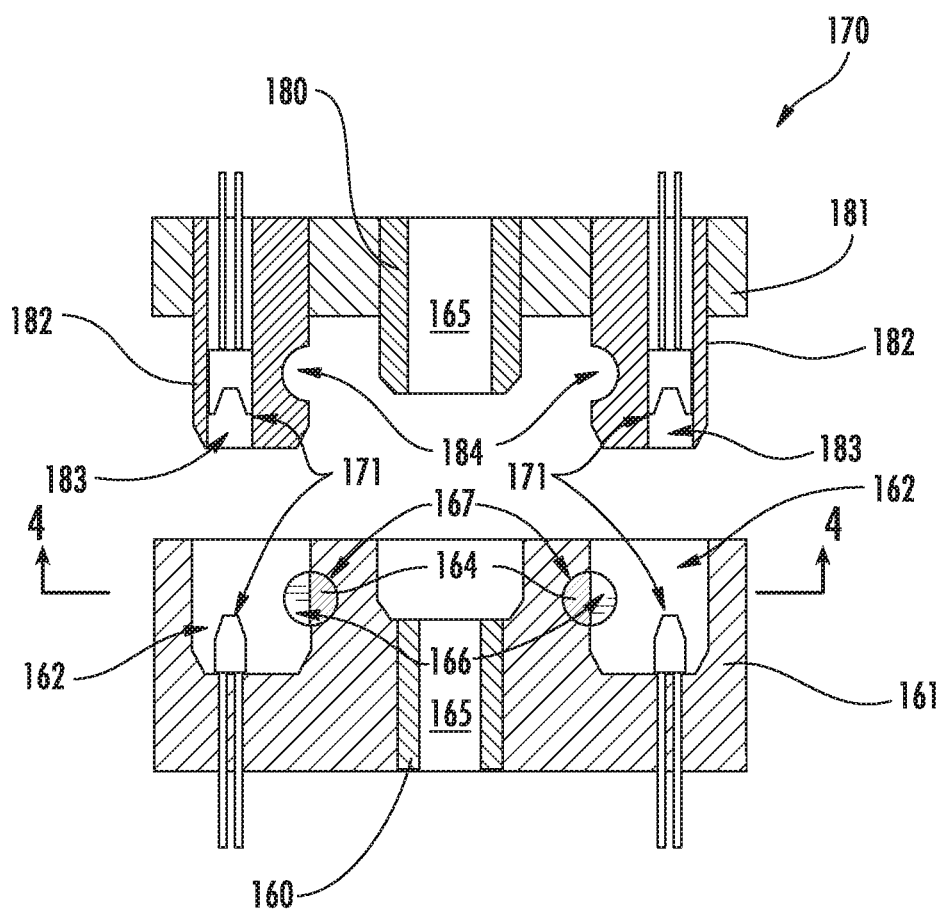
FIG. 3 illustrates a coupling system of the top drive system of FIG. 2.
Figure 4:
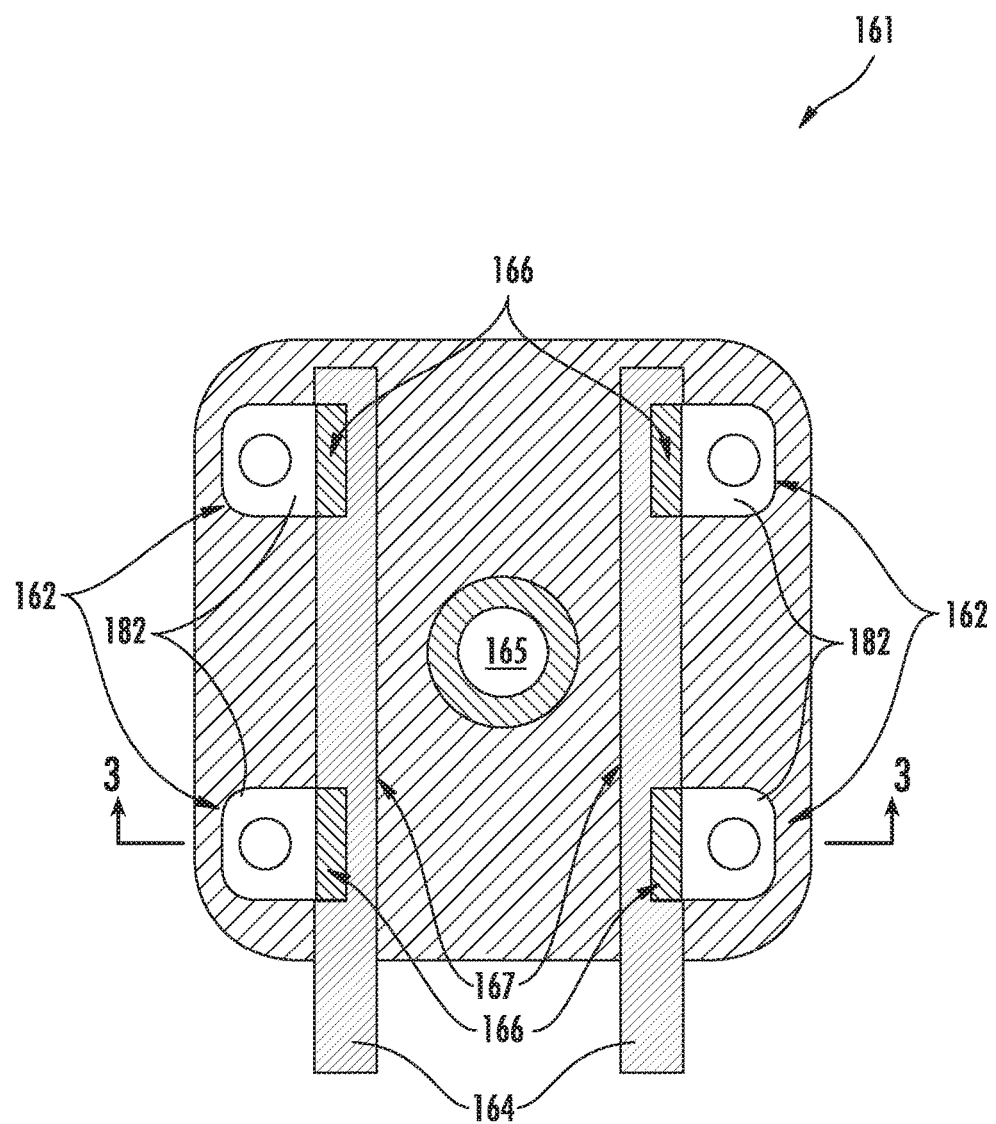
FIG. 4 further illustrates aspects of the coupling system of FIG. 3.

FIGS. 3 and 4 illustrate a coupling system 170, according to embodiments described herein. FIG. 3 shows a vertical cross-sectional view prior to coupling, and FIG. 4 shows a horizontal cross-sectional view, mid-coupling. The coupling system 170 includes an upper plate 181 that may be translationally and rotationally fixed to housing 120, and a lower plate 161 that may be translationally fixed to tool stem 160. Drive unit 110 may include upper plate 181 as a first portion of coupling system 170. Drive stem 180 may extend through upper plate 181. Drive stem 180 may rotate relative to upper plate 181. Tool adapter 150 may include lower plate 161 as a second portion of coupling system 170. Tool stem 160 may extend through lower plate 161. Tool stem 160 may rotate relative to lower plate 161. Upper plate 181 may include a plurality of stabbing members, such as docking sleeves 182. The stabbing members may be perpendicular to the upper plate 181. Each docking sleeve 182 may include an inner bore 183 and/or a notch 184. The inner bore 183 may extend vertically through docking sleeve 182, for example connecting to a port of housing 120. The notch 184 may be on an external surface of docking sleeve 182. In the illustrated embodiment, notch 184 is on a medial external surface of docking sleeve 182. In the cross-section illustrated in FIG. 3, two docking sleeves 182 are shown. In the cross-section illustrated in FIG. 4, four docking sleeves 182 are shown. The docking sleeves 182 may be disposed on upper plate 181 peripherally to central bore 165. It should be appreciated that other numbers, sizes, and/or configurations of docking sleeves may be considered to accommodate manufacturing and operational conditions. Lower plate 161 may include a plurality of hollows, such as docking recesses 162, configured to surround and/or and mate with docking sleeves 182.

Figure 5:
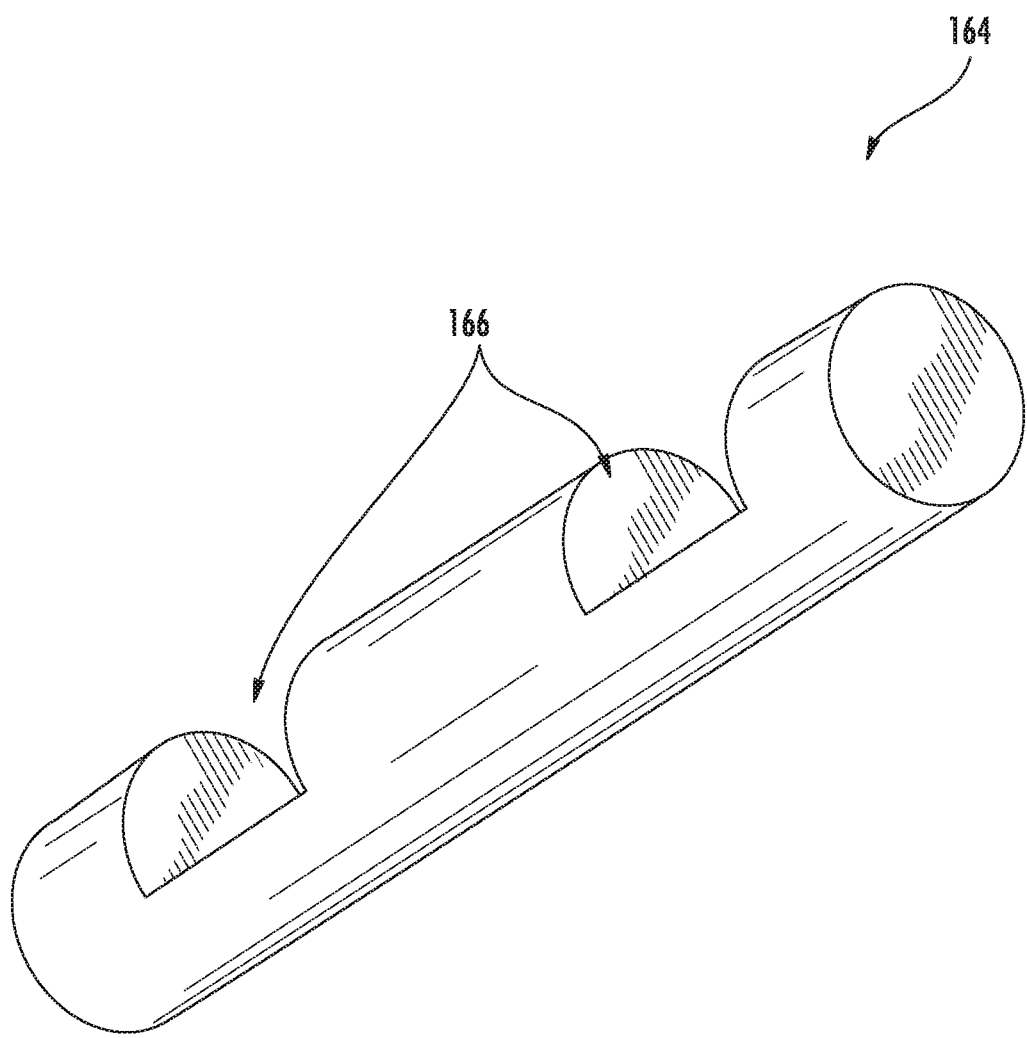
FIG. 5 further illustrates aspects of the coupling system of FIG. 3.

Lower plate 161 may also include one or more bars 164 within bores 167. The bores 167 may be parallel to the lower plate 161. As illustrated in FIG. 4, each bar 164 may traverse horizontally through lower plate 161. A portion of each bar 164 may traverse through a wall of one or more of the docking recesses 162. As illustrated in FIG. 5, each bar 164 may be generally cylindrical. Each bar 164 may have one or more coupling recesses 166. The length, depth, and location of each coupling recess 166 on bar 164 may match that of the docking recesses 162 through which bar 164 traverses. Lower plate 161 may have horizontal bores 167 through which bars 164 traverse. The bores 167 may likewise traverse docking recesses 162. It should be appreciated that a generally cylindrical shape of the bars 164 and of the bores 167 may allow rotation of bars 164 within bores 167. However, other shapes of bars 164 and/or bores 167 may be considered to accommodate manufacturing and operational conditions.

Figure 6A:
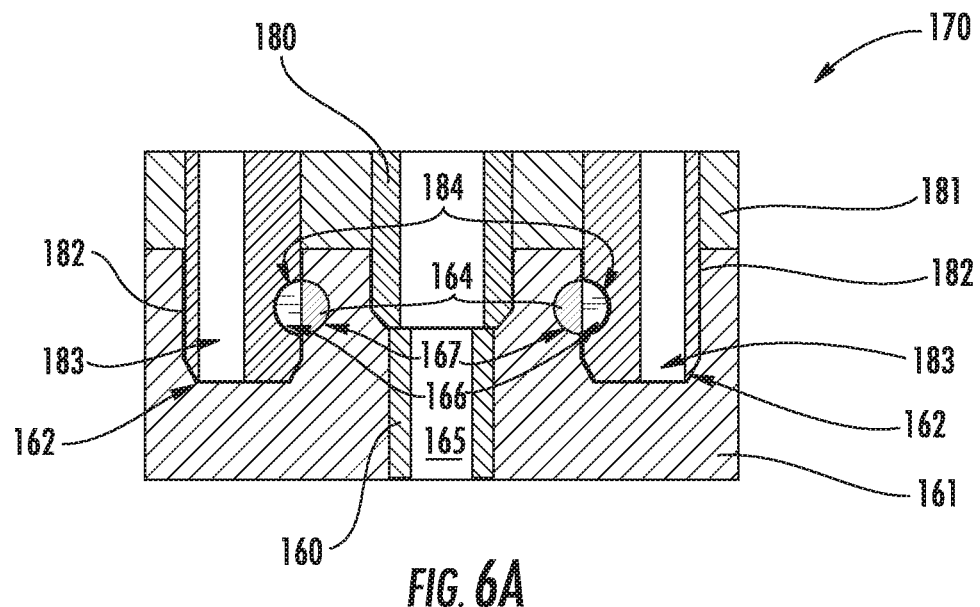
FIGS. 6A-6B further illustrate aspects of the coupling system of FIG. 3.

Bar 164 may rotate within bore 167. In an "open" position, as illustrated, bar 164 is rotated within bore 167 so that the coupling recess 166 faces towards the docking recess 162 (FIGS. 3, 4, and 6A). Therefore, in the open position, bar 164 may be disposed in bore 167, and coupling recess 166 may be disposed in docking recess 162 (in the notch 184 of the docking sleeve 182). Bar 164 and docking recess 162 may thereby together form a flat surface in the wall of coupling recess 162. When bar 164 is in the open position, docking sleeve 182 may stab into (and withdraw out of) docking recess 162. FIG. 6A illustrates upper plate 181 joined to lower plate 161, with docking sleeves 182 stabbed into docking recesses 162, and bars 164 in the open position.

Figure 6B:
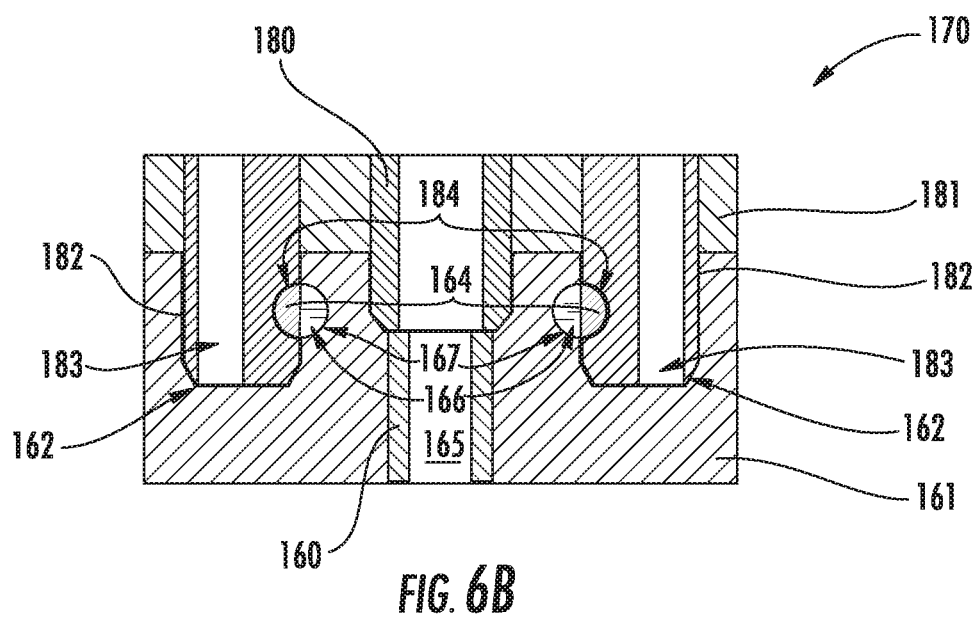

In a "closed" position, as illustrated, bar 164 is rotated within bore 167 so that the coupling recess 166 faces away from the docking recess 162 (FIG. 6B). Therefore, in the closed position, bar 164 may be disposed in docking recess 162 (in the notch 184 of the docking sleeve 182), and coupling recess 166 may be disposed in bore 167. Bar 164 may thereby form a convex feature on the wall of coupling recess 162. When bar 164 is in the closed position, docking sleeve 182 may be secured in docking recess 162. FIG. 6B illustrates upper plate 181 joined to lower plate 161, with docking sleeves 182 stabbed into docking recesses 162, and bars 164 in the closed position. Bars 164 may thereby provide fixation of upper plate 181 joined to lower plate 161.

When upper plate 181 is joined to lower plate 161, with docking sleeves 182 stabbed into docking recesses 162, and with bars 164 in the closed position, axial load may be transferred from tool string 2 to top drive system 100. For example, axial load may be transferred from tool string 2 to tool stem 160, through lower plate 161, to bores 167, to bars 164, to notch 184, to docking sleeve 182, through upper plate 181 to housing 120, and thereby to drive unit 110. In some embodiments, tool adapter 150 may include a locking feature (not shown) to secure bars 164 in the closed position. The locking feature may be configured to provide an external (outside of housing 120) visual representation of whether the bars 164 are secured in the closed position. In some embodiments, tool adapter 150 may include an actuator (not shown) to rotate bars 164 between the open position and the closed position. For example, the actuator may be manual, hydraulic, pneumatic, electrical, etc. In some embodiments, the actuator may provide an external visual representation of the position of the bars 164. In some embodiments, the locking feature may be operationally coupled to the actuator. In some embodiments, rotation of bars 164 may be restricted, for example rotating at most through a 180° angle.

As would be understood by one of ordinary skill in the art with the benefit of this disclosure, drive stem 180 may support the axial load of tool string 2 by coupling to tool stem 160 with coupling system 170. Therefore, the number and sizing of bars 164 (and, therefore, the number and sizing of notches 184, docking recesses 162, and docking sleeves 182) may be selected to support the expected axial load. For the same sizing, an increased number of bars 164 may be desired to support an increased expected axial load. For the same number, an increased sizing of bars 164 may be desired to support an increased expected axial load. It should be appreciated that the configuration of the components of upper plate 181 and lower plate 161 may be reversed. For example, docking recesses 162, bars 164, and bores 167 may be included in the upper plate 181, while docking sleeves 182 and notches 184 may be included in the lower plate 161.

Figure 7:
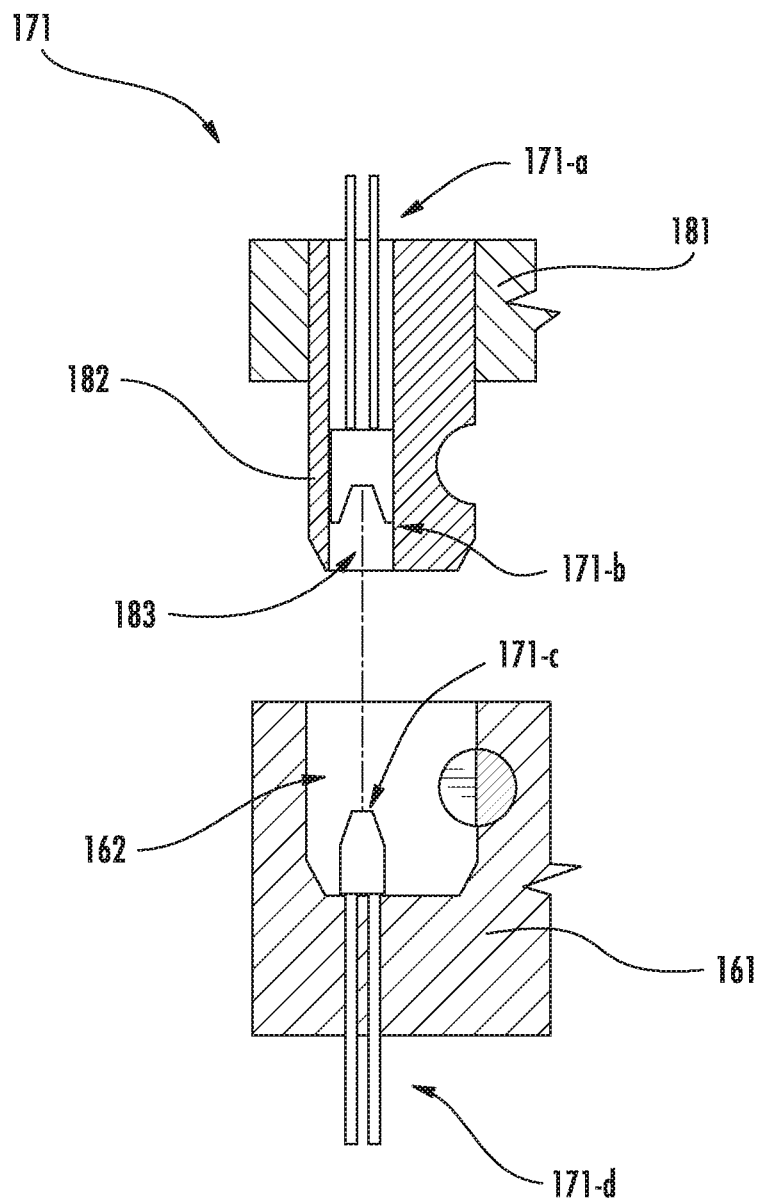
FIG. 7 further illustrates aspects of the coupling system of FIG. 3.

Coupling system 170 may also include auxiliary couplings 171. For example, auxiliary couplings 171 may include hydraulic couplings, pneumatic couplings, electronic couplings, fiber optic couplings, power couplings, data couplings, and/or signal couplings. In the embodiment illustrated in FIG. 7, auxiliary coupling 171 may include a supply line 171-*a* disposed in the inner bore 183 of docking sleeve 182 in upper plate 181, a socket 171-*b* attached to the supply line 171-*a*, a plug 171-*c* disposed in docking recess 162 of lower plate 161, and a delivery line 171-*d* attached to the plug 171-*c* and fixed in or on lower plate 161. Plug 171-*c* is configured to securely mate with socket 171-*b* when upper plate 181 is joined to lower plate 161, with docking sleeve 182 stabbed into docking recess 162. It should be appreciated that other configurations of supply lines, sockets, plugs, and delivery lines may be considered to accommodate manufacturing and operational conditions, including configurations without sockets and/or plugs. In some embodiments, the auxiliary couplings 171 are quick-connect couplings. In some embodiments, multiple auxiliary couplings 171 are disposed in a single docking sleeve 182 and/or docking recess 162. In some embodiments, inner bore 183 and/or docking recess 162 may have a removable cover (not shown) to protect auxiliary couplings 171 when upper plate 181 is not joined to lower plate 161. For example, a removable cover may be attached across the face of lower plate 161 when tool adapter 150 is stored, thereby protecting auxiliary couplings 171 in one or more docking recesses 162.

Figure 8:
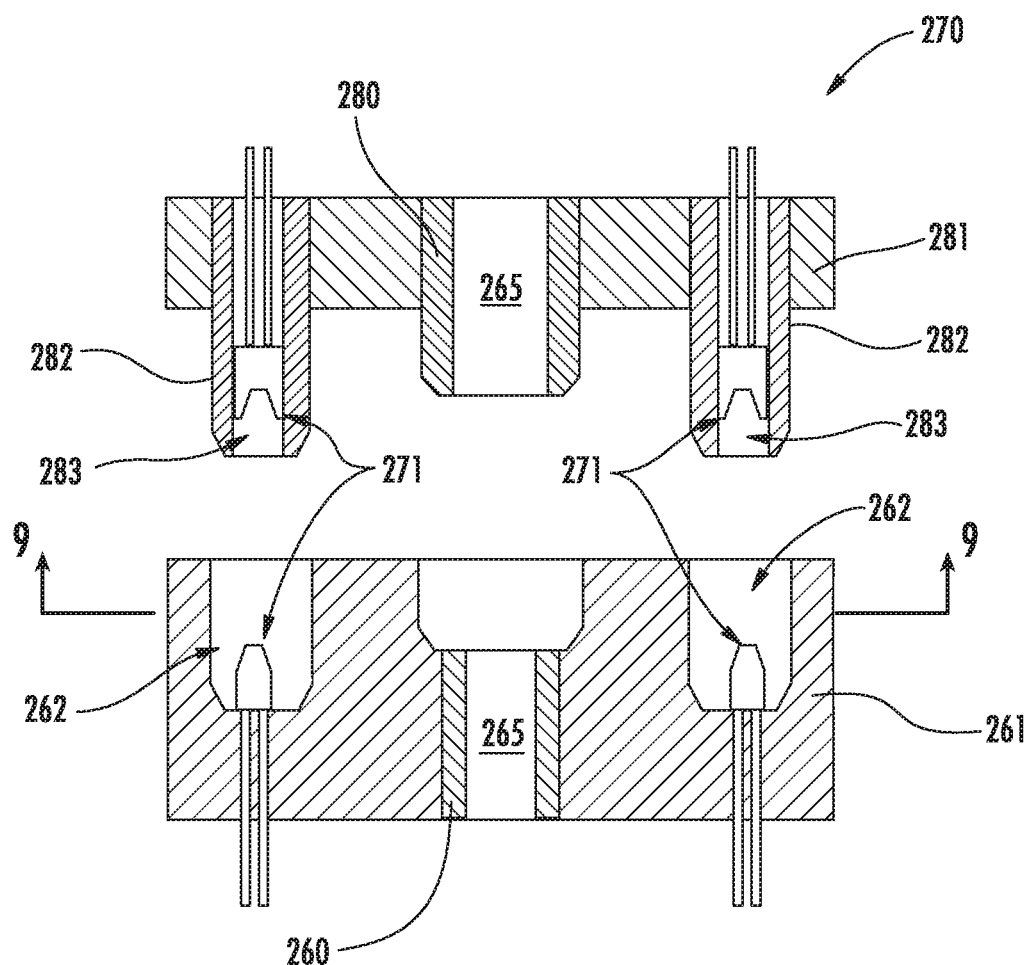
FIG. 8 illustrates another coupling system of the top drive system of FIG. 2.
Figure 9:
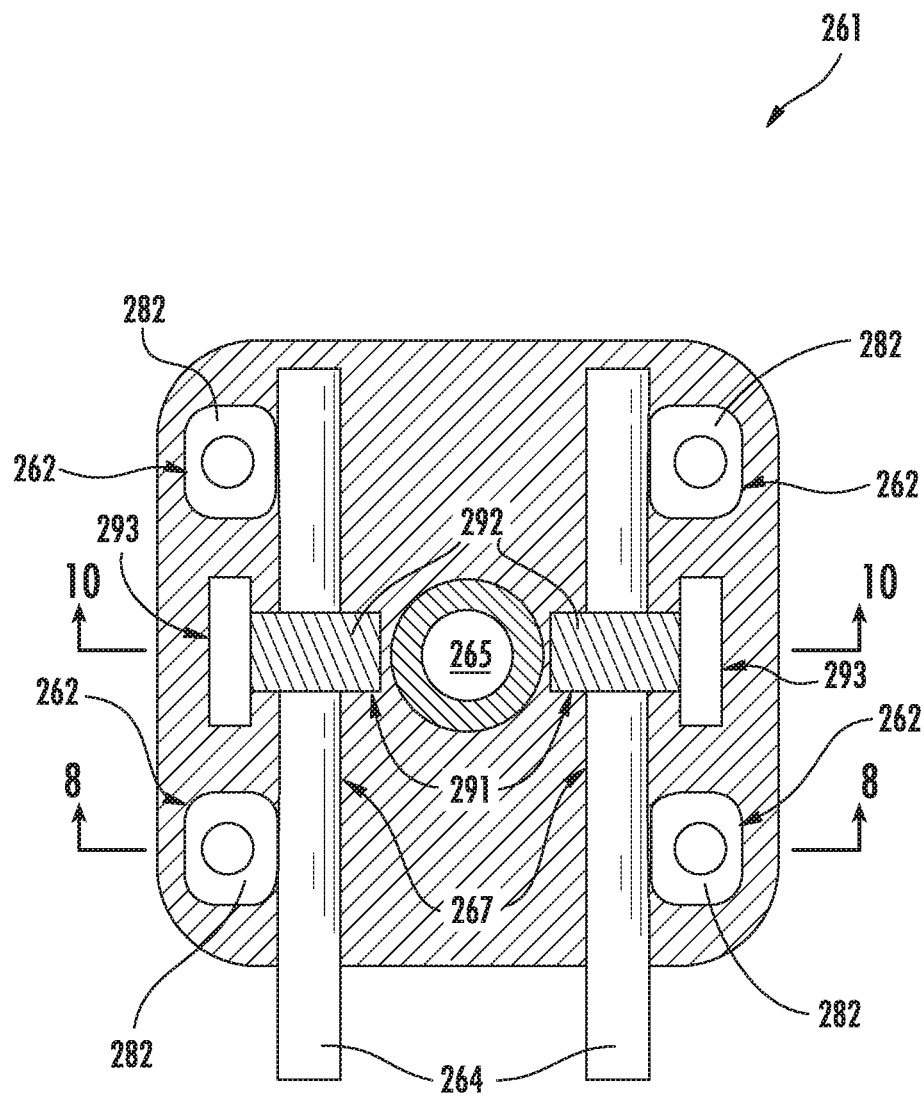
FIG. 9 further illustrates aspects of the coupling system of FIG. 8.
Figure 10:
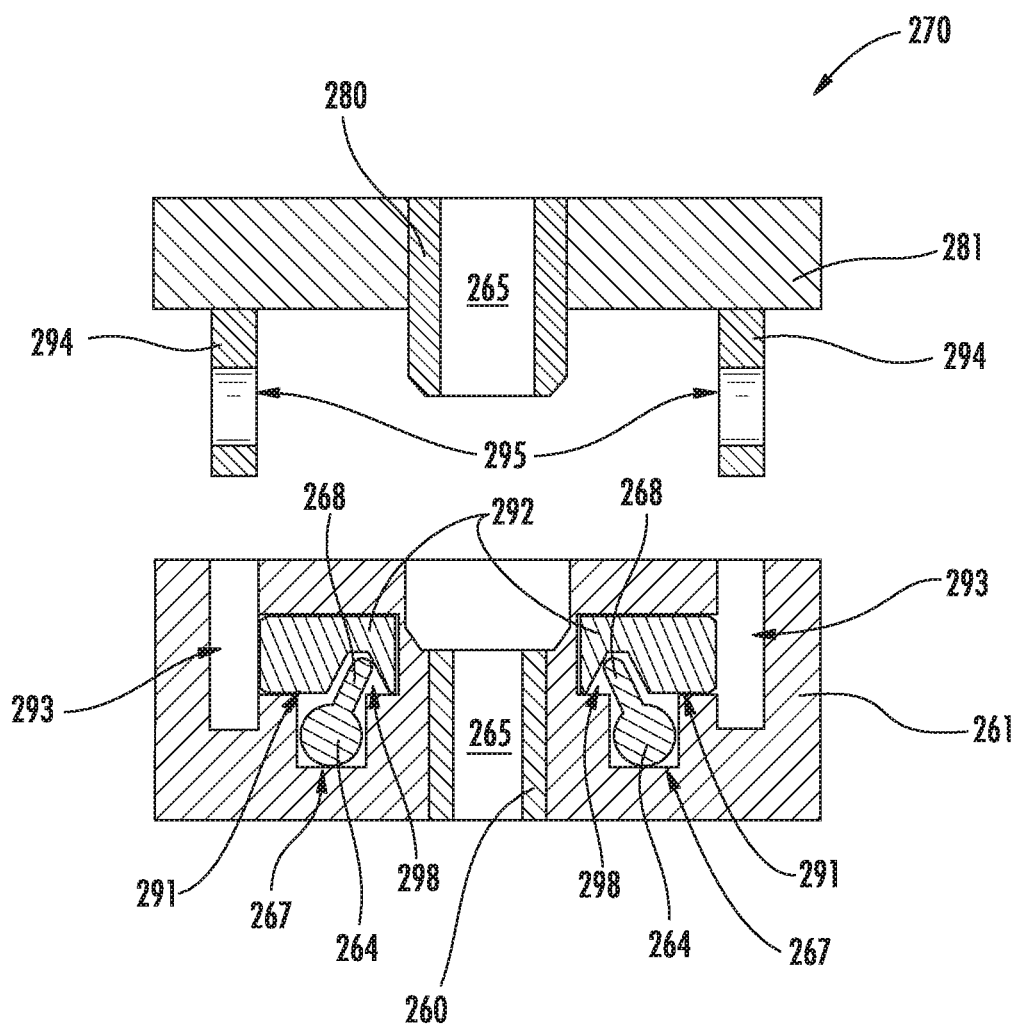
FIG. 10 further illustrates aspects of the coupling system of FIG. 8.

FIGS. 8, 9, and 10 illustrate an alternative coupling system 270, according to embodiments described herein. FIGS. 8 and 10 show vertical cross-sectional views prior to coupling, and FIG. 9 shows a horizontal cross-sectional view, mid-coupling. Except as noted, coupling system 270 is configured and functions similarly to coupling system 170. For example, coupling system 270 includes an upper plate 281 and a lower plate 261. Drive unit 110 may include upper plate 281 as a first portion of coupling system 270. Drive stem 280 may extend through upper plate 281 and may rotate relative thereto. Tool adapter 150 may include lower plate 261 as a second portion of coupling system 270. Tool stem 260 may extend through lower plate 261 and may rotate relative thereto. Upper plate 281 may include a plurality of docking sleeves 282, each of which may include an inner bore 283. The docking sleeves 282 may be perpendicular to the upper plate 281. The docking sleeves 282 may be disposed on upper plate 281 peripherally to central bore 265. In the cross-section illustrated in FIG. 8, two docking sleeves 282 are shown, while four docking sleeves 282 are shown in FIG. 9. It should be appreciated that other numbers, sizes, and/or configurations of docking sleeves may be considered to accommodate manufacturing and operational conditions. Lower plate 261 may include a plurality of docking recesses 262 configured to surround and/or and mate with docking sleeves 282.

Figure 11:
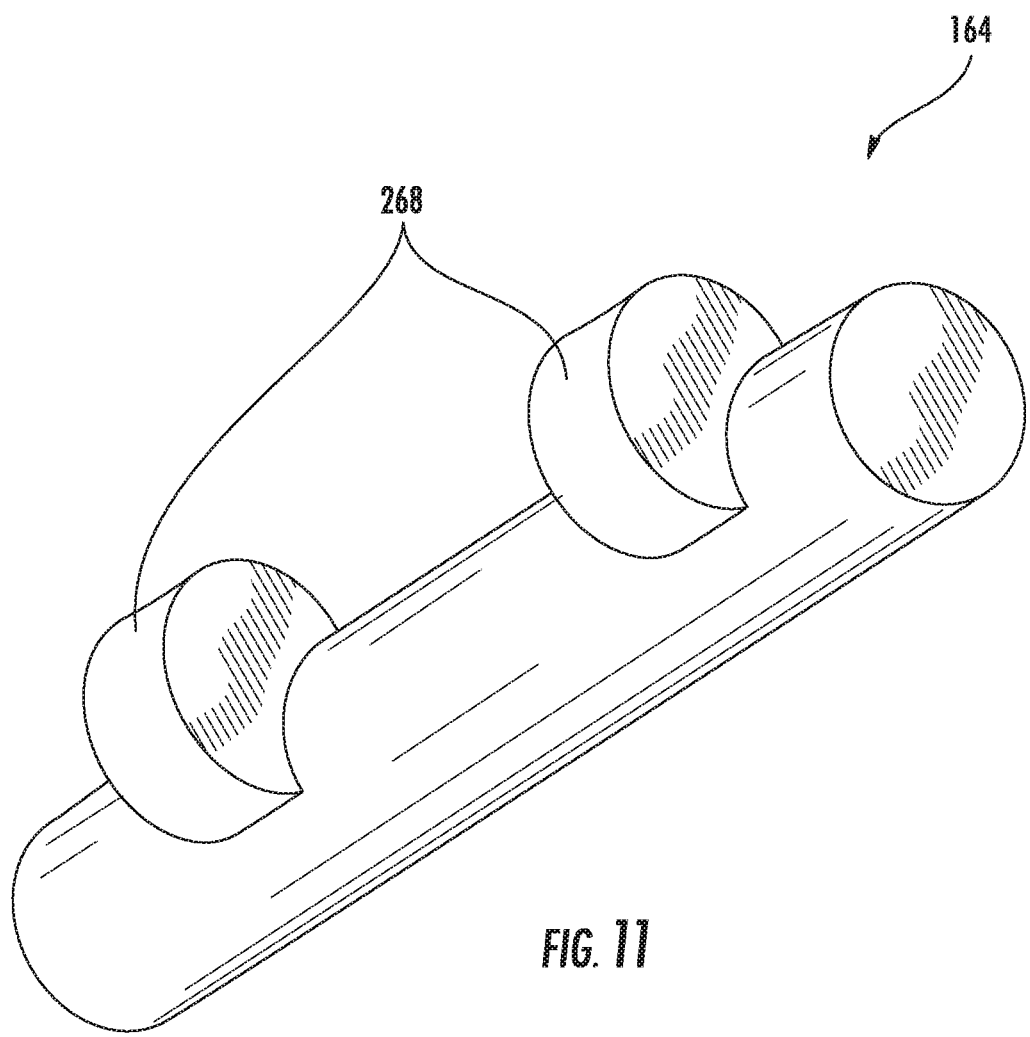
FIG. 11 further illustrates aspects of the coupling system of FIG. 8.

Lower plate 261 may also include one or more bars 264 within bores 267. The bores 267 may be parallel to the lower plate 261. As illustrated in FIG. 9, each bar 264 may traverse horizontally through lower plate 261. For coupling system 270, none of the bars 264 traverse through the docking recesses 262. Bores 267 may be disposed in lower plate 261 adjacent to or remote from docking recesses 262. As illustrated in FIG. 11, each bar 264 may be generally cylindrical. It should be appreciated that a generally cylindrical shape of the bars 264 and of the bores 267 may allow rotation of bars 264 within bores 267. However, other shapes of bars 264 and/or bores 267 may be considered to accommodate manufacturing and operational conditions. Each bar 264 may have one or more pins 268 extending radially out from the main body of the bar 264. As illustrated in FIG. 10, bores 267 may be disposed in lower plate 261 immediately above or immediately below pockets 291. Keys 292 may be disposed in pockets 291. Keys 292 may have pin holes 298 on the side adjacent to bores 267. The length, depth, and location of each pin 268 on bar 264 may match that of the pin holes 298 in keys 292 in pockets 291. Pockets 291 may be open on at least a portion of the side adjacent to bores 267. For example, bore 267 may join to pocket 291 to form a contiguous volume. The cross-sectional area of the contiguous volume may not decrease from the widest portion of the bore 267, through the side adjacent the pocket 291, and to the distal side of the pocket 291. Pin 268 may thereby extend radially outward from the main body of bar 264 (in bore 267) into pin hole 298 of key 292 in pocket 291.

Figure 13:
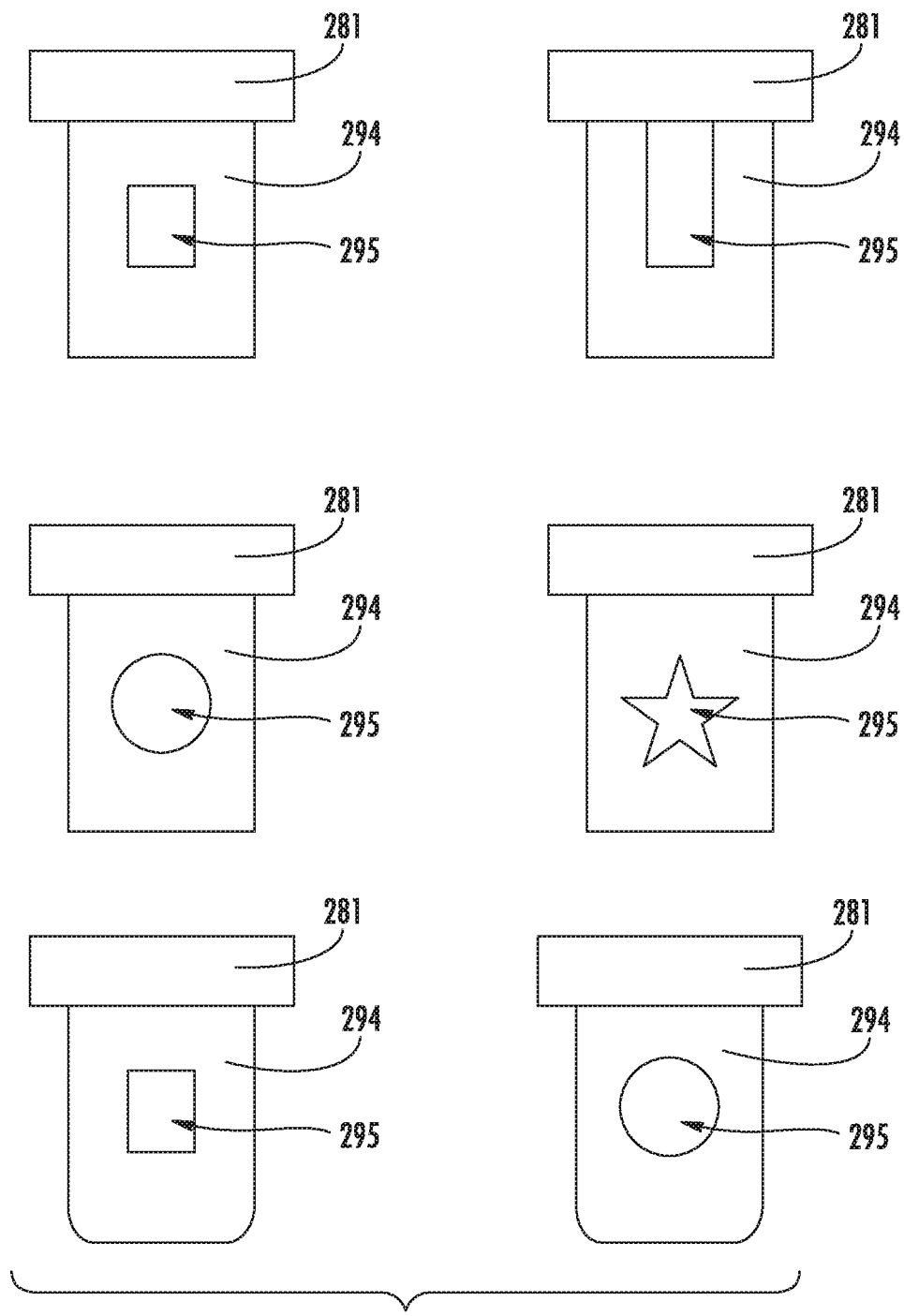
FIG. 13 further illustrates aspects of the coupling system of FIG. 8.

Lower plate 261 may also include one or more hollows, such as cavities 293 adjacent to pockets 291. Pockets 291 may be open on at least a portion of the side adjacent to cavities 293. For example, cavity 293 may join to pocket 291 to form a contiguous volume. The cross-sectional area of the contiguous volume may not decrease from the widest portion of the pocket 291, through the side adjacent the cavity 293, and to the distal side of the cavity 293. Upper plate 281 may include a plurality of stabbing members, such as key plates 294 having key holes 295. The stabbing members may be perpendicular to the upper plate 281. Key plates 294 may be attached to or disposed on the underside of upper plate 281. Each key plate 294 may be complementary to a cavity 293. Cavities 293 may be configured to surround and/or and mate with key plates 294. The length, depth, and location of each key hole 295 on key plate 294 may match that of the pockets 291 adjacent to cavity 293. Consequently, key 292 may slide from pocket 291 into cavity 293, and likewise into key hole 295 in key plate 294. Exemplary cross-sectional shapes of key plate 294 and key hole 295 are shown in FIG. 13. It should be appreciated that other numbers, sizes, and/or configurations of cavities 293, key plates 294, key holes 295, pockets 291, and keys 292 may be considered to accommodate manufacturing and operational conditions.

Figure 12A:
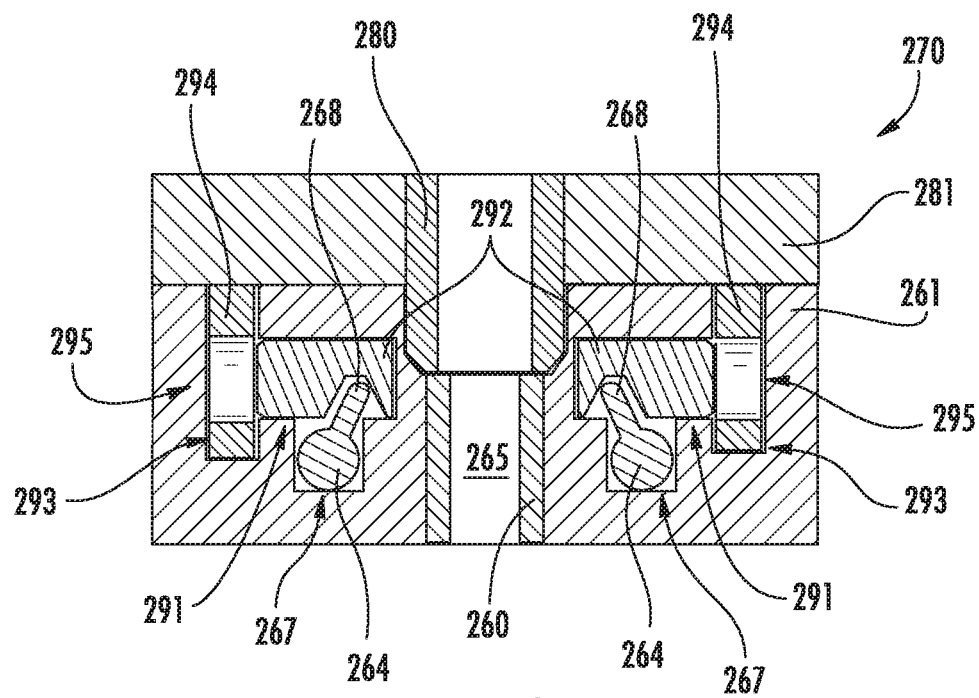
FIGS. 12A-12B further illustrate aspects of the coupling system of FIG. 8.

Bar 264 may rotate within bore 267. In an "open" position, as illustrated, bar 264 is rotated within bore 267 so that pin 268 is pointed away from cavity 293 (FIGS. 10 and 12A). With pin 268 pointed away from cavity 293, key 292 may be contained within pocket 291, not extending into cavity 293. Key 292 and cavity 293 may thereby together form a flat surface in the wall of cavity 293. When bar 264 is in the open position, key plate 294 may stab into (and withdraw from) cavity 293. FIG. 12A illustrates upper plate 281 joined to lower plate 261, with key plates 294 stabbed into cavities 293, and bars 264 in the open position.

Figure 12B:
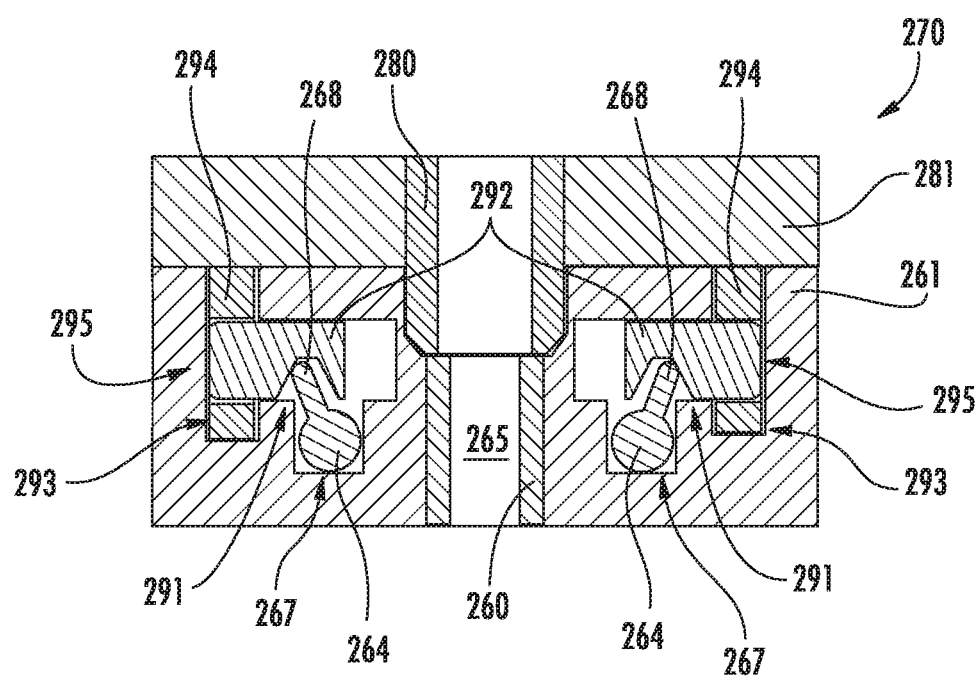

In a "closed" position, as illustrated, bar 264 is rotated within bore 267 so that pin 268 is pointed towards cavity 293 (FIG. 12B). With pin 268 pointed towards cavity 293, key 292 extend into cavity 293, and thereby into key hole 295 of key plate 294. When bar 264 is in the closed position, key plate 294 may be secured in cavity 293. FIG. 12B illustrates upper plate 281 joined to lower plate 261, with key plates 294 stabbed into cavities 293, and bars 264 in the closed position.

When upper plate 281 is joined to lower plate 261, with key plates 294 stabbed into cavities 293, and with bars 264 in the closed position, axial load may be transferred from tool string 2 to top drive system 100. For example, axial load may be transferred from tool string 2 to tool stem 160, through lower plate 261, to pocket 291, to keys 292, to key holes 295, to key plates 294, through upper plate 281 to housing 120, and thereby to drive unit 110. In some embodiments, tool adapter 150 may include a locking feature (not shown) to secure bars 264 in the closed position. The locking feature may be configured to provide an external (outside of housing 120) visual representation of whether the bars 264 are secured in the closed position. In some embodiments, tool adapter 150 may include an actuator (not shown) to rotate bars 264 between the open position and the closed position. For example, the actuator may be manual, hydraulic, pneumatic, electrical, etc. In some embodiments, the actuator may provide an external visual representation of the position of the bars 264. In some embodiments, the locking feature may be operationally coupled to the actuator. In some embodiments, rotation of bars 264 may be restricted, for example rotating at most through a 180° angle.

As with coupling system 170, the number and sizing of bars 264 (and, therefore, the number and sizing of keys 292, pockets 291, cavities 293, key holes 295, and key plates 294) may be selected to support the expected axial load. For the same sizing, an increased number of bars 264 may be desired to support an increased expected axial load. For the same number, an increased sizing of bars 264 may be desired to support an increased expected axial load. It should be appreciated that the configuration of the components of upper plate 281 and lower plate 261 may be reversed. For example, cavities 293, bars 264, and bores 267 may be included in the upper plate 281, while key plates 294 and keys 292 may be included in the lower plate 261. Docking sleeves 282 may be included on the same plate as the key plates 294 (as shown in FIGS. 8-10), or docking recesses 262 may be included on the same plate as the key plates 294 (not shown).

Coupling system 270 may also include auxiliary couplings 271 configured similarly to auxiliary couplings 171. For example, auxiliary couplings 271 may include hydraulic couplings, pneumatic couplings, electronic couplings, fiber optic couplings, power couplings, data couplings, and/or signal couplings. Auxiliary couplings 271 may be disposed in the inner bores 283 of docking sleeves 282, in docking recess 262 of lower plate 261, and/or fixed in or on lower plate 261.

Figure 14:
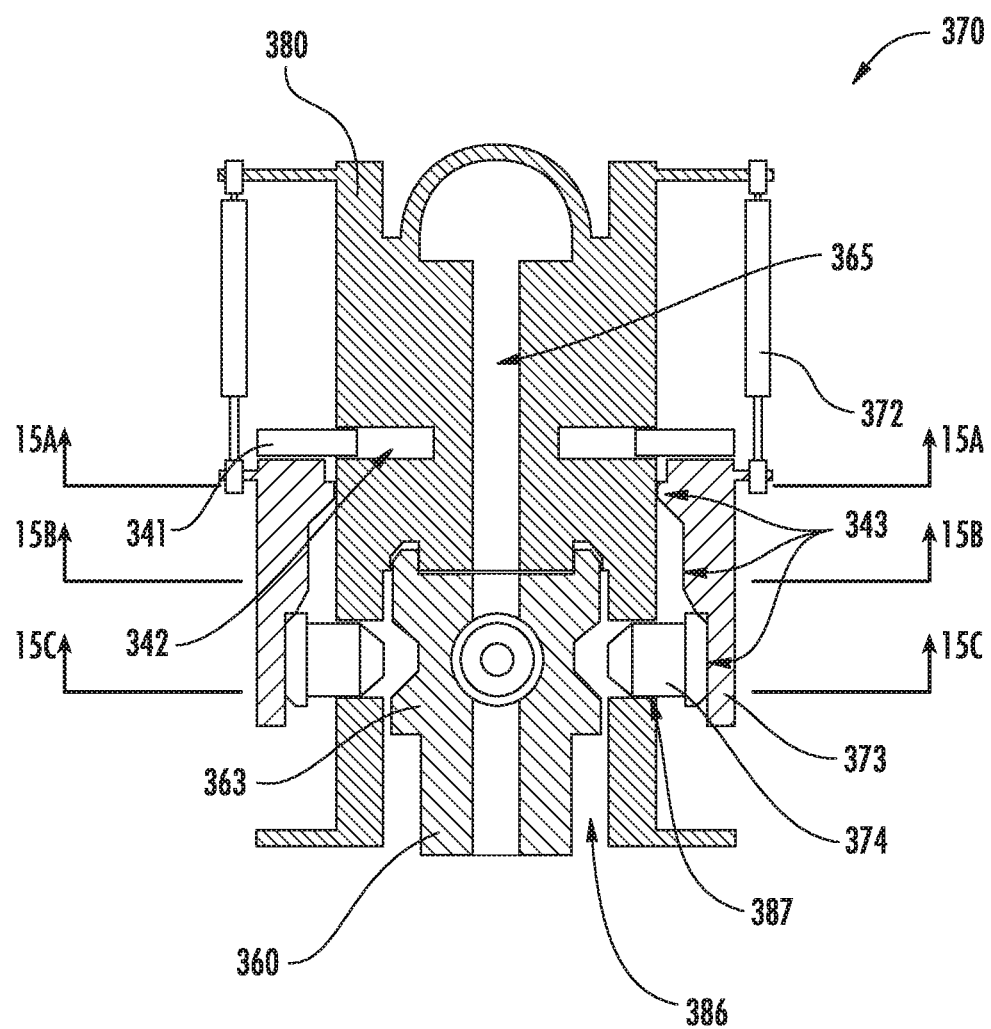
FIG. 14 illustrates another coupling system of the top drive system of FIG. 2.

FIG. 14 illustrates an alternative coupling system 370, according to embodiments described herein. Drive unit 110 may include drive stem 380 as a first portion of coupling system 370, and tool adapter 150 may include tool stem 360 as a second portion of coupling system 370. As with coupling systems 170 and 270, coupling system 370 may couple drive stem 380 with tool stem 360 to create a shared central bore 365 (e.g. providing fluid communication from drive unit 110 to tool adapter 150). Drive stem 380 may have a coupling recess 386. Coupling recess 386 may be a downwards opening on a lower portion of drive stem 380. Coupling recess 386 may be sized to be larger than coupling head 363 of tool stem 360. When drive unit 110 is coupled to tool adapter 150, coupling head 363 may be stabbed into and/or surrounded by coupling recess 386.

Figure 15A:
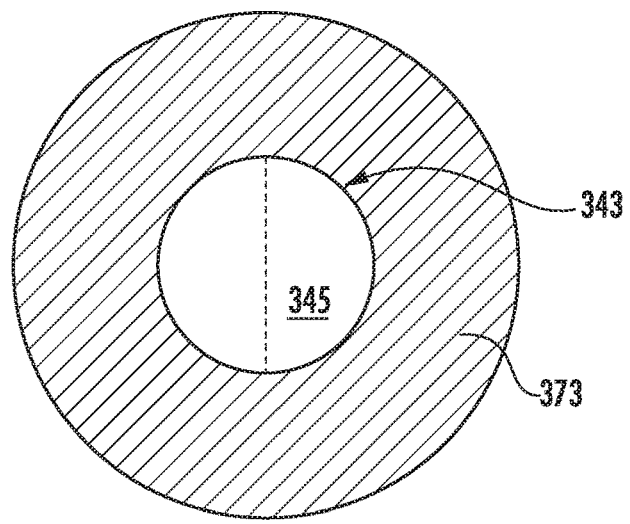
FIGS. 15A-15C further illustrate aspects of the coupling system of FIG. 14.
Figure 15B:
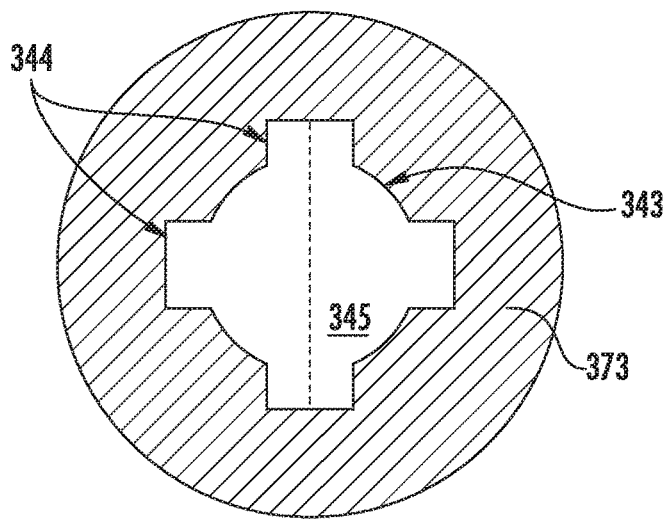
Figure 15C:
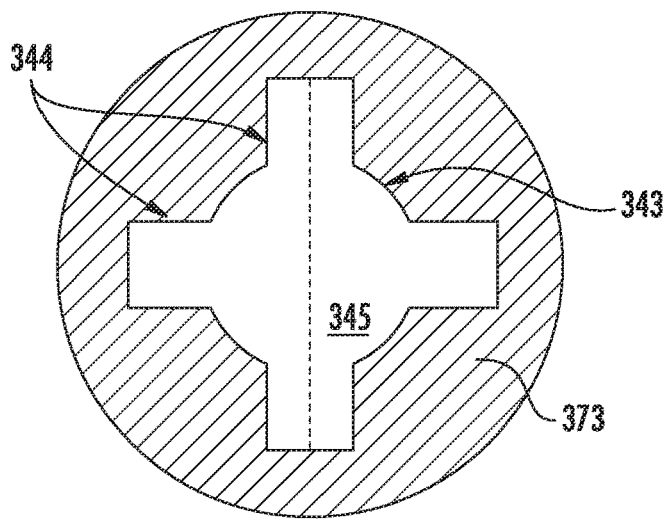

Drive unit 110 may also include one or more actuators 372, fixation ring 373, and one or more bolts 374 as first portions of coupling system 370. The fixation ring 373 may encircle the drive stem 380. The fixation ring 373 may move vertically relative to the drive stem 380. The actuators 372 (e.g., hydraulic cylinders) may move the fixation ring 373 vertically relative to drive stem 380. The bolts 374 may move radially (with respect to central bore 365) in ports 387 of drive stem 380. The ports 387 may extend from an exterior of the drive stem 380 to coupling recess 386. An interior end (closest to central bore 365) of bolts 374 may be chamfered. An exterior end (farthest from central bore 365) of bolts 374 may have a retaining lip. Fixation ring 373 may contact the exterior end of the bolts 374. The ports 387 may (as shown) or may not (not shown) be distributed symmetrically about the central bore 365. In some embodiments, drive stem 380 may have one or more grooves 342 for maintenance pins 341. The grooves 342 may be located proximate an end of the stroke of the actuators 372. In some embodiments, fixation ring 373 may have one or more inner contours 343. As illustrated in FIG. 14, fixation ring 373 has three inner contours 343, which progressively increase in maximum inner diameter 345 from the top to the bottom of fixation ring 373. This may be better seen in the cross-sections of fixation ring 373 shown in FIGS. 15A-15C. For example, FIG. 15B illustrates an upper (vertically higher) inner contour 343 with an upper maximum inner diameter 345. FIG. 15C illustrates a lower (vertically lower) inner contour 343 with a lower maximum inner diameter 345. The lower maximum inner diameter 345 of FIG. 15C is greater than the upper maximum inner diameter 345 of FIG. 15B. Inner contours 343 may include grooves 344 that are sized and located to receive bolts 374. It should be understood that, when inner contour 343 includes a groove 344, maximum inner diameter 345 will have at least one endpoint in a groove 344. Optionally, fixation ring 373 may be a single component forming a complete multi-contoured ring, multiple components connected together to form a complete multi-contoured ring, a single component forming a partial multi-contoured ring, or multiple components connected together to form one or more contours, complete rings, and/or partial rings.

Figure 16A:
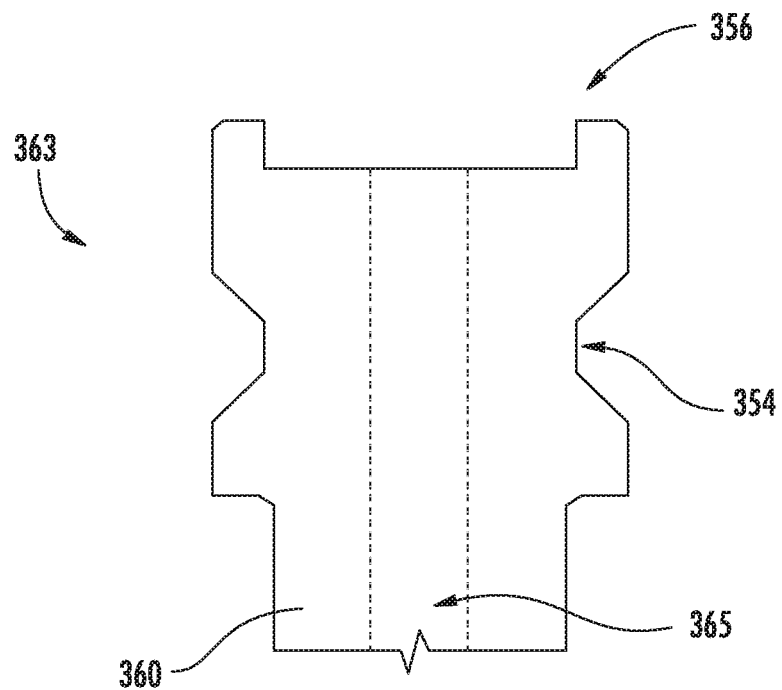
FIGS. 16A-16B further illustrate aspects of the coupling system of FIG. 14.
Figure 16B:
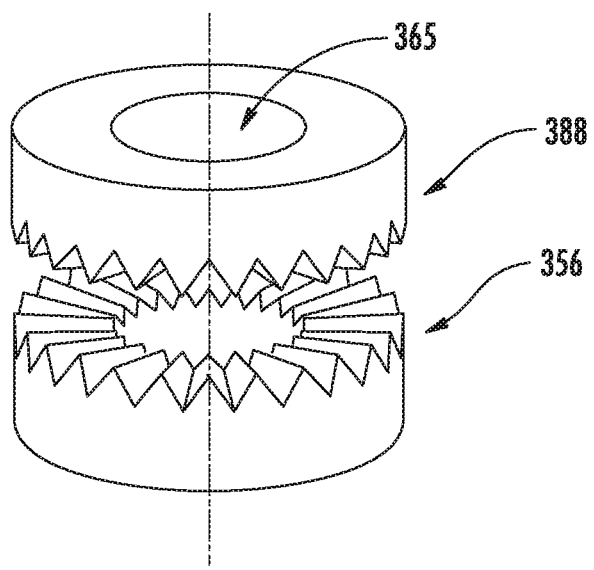

FIG. 16A illustrates an exemplary coupling head 363 of tool stem 360. Tool adapter 150 may include coupling head 363 of tool stem 360 as a second portion of coupling system 370. Coupling head 363 has one or more notches 354 sized and located to receive bolts 374. Coupling head 363 may have more notches 354 than there are bolts 374. The notches 354 may be distributed around the exterior of coupling head 363. The bolts 374 and notches 354 may be sized and shaped so that the bolts 374 are self-centering in the notches 354. The notches 354 may (as shown) or may not (not shown) be distributed symmetrically about the central bore 365. Coupling head 363 may also have a crown 356. Crown 356 may have a contoured face that meshes with guide 388 proximal the top of coupling recess 386 of drive stem 380. For example, as illustrated in FIG. 16B, crown 356 may have teeth distributed around central bore 365. Guide 388 may have complementary sized and distributed teeth. In some embodiments, the number, size, and distribution of the teeth on crown 356 and guide 388 are selected so that pressure between crown 356 and guide 388 causes rotation of crown 356 around central bore 365 until and unless a selected orientation between crown 356 and guide 388 is achieved. In some embodiments, there may be more than one selected orientation. For example, pressure between crown 356 and guide 388 may cause crown 356—and thereby coupling head 363—to rotate until ports 387 of drive stem 380 align with notches 354 of tool stem 360.

Drive unit 110 may be coupled to tool adapter 150 in order to transfer bi-directional torque, load, power, data, and/or signals between the top drive and the tool. Coupling of drive unit 110 to tool adapter 150 may proceed as a multi-step process. In one embodiment, the coupling begins with tool stem 360 being oriented and/or aligned below drive stem 380. Coupling head 363 of tool stem 360 may be stabbed into coupling recess 386 of drive stem 380. Tool stem 360 may be raised relative to drive stem 380 (and/or drive stem 380 may be lowered relative to tool stem 360). The coupling head 363 and/or the coupling recess 386 may have guiding chamfers. In some embodiments, a contoured face of crown 356 of coupling head 363 engages with a contoured face of guide 388 proximal a top of coupling recess 386. Pressure between guide 388 and crown 356 may cause coupling head 363 to rotate until a selected orientation between drive stem 380 and tool stem 360 is achieved. For example, coupling head 363 may rotate until ports 387 of drive stem 380 align with notches 354 of tool stem 360. This may improve the speed of the coupling process.

Figure 17:
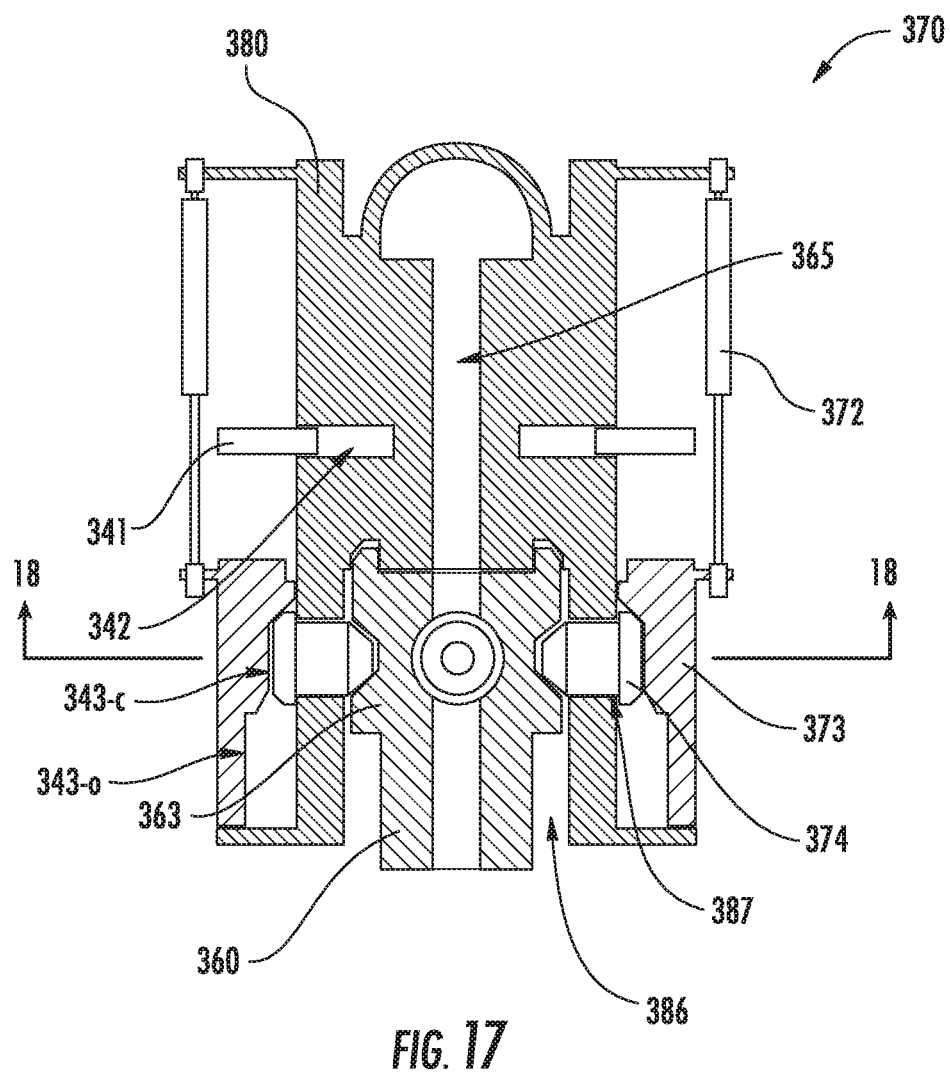
FIG. 17 further illustrates aspects of the coupling system of FIG. 14.

Once the coupling head 363 is stabbed into and oriented with the coupling recess 386, actuators 372 may cause fixation ring 373 to move downwards relative to drive stem 380. As illustrated in FIG. 17, bolts 374 may thereby move radially inwards relative to central bore 365. For example, inner contour 343-c of fixation ring 373 may have a smaller maximum inner diameter 345 than inner contour 343-o. With fixation ring 373 in an open position (as illustrated in FIG. 14), bolts 374 may engage fixation ring 373 at inner contour 343-o, and bolts 374 may be recessed within ports 387. Downwards motion of fixation ring 373 may causes bolts 374 to engage fixation ring 373 at inner contour 343-c. Bolts 374 may thereby move radially inwards in ports 387 to extend into notches 354 of coupling head 363. Fixation ring 373 may be in a closed position when bolts 374 engage a portion of inner contour 343 with a smaller maximum inner diameter. With fixation ring 373 in a closed position, the bolts 374 may be secured in the notches 354. The bolts 374, notches 354, and/or the inner contour 343 of fixation ring 373 may have guiding chamfers. As would be understood by one of ordinary skill in the art with the benefit of this disclosure, when fixation ring 373 is in the open position, vertical motion of tool stem 360 (relative to drive stem 380) may cause pressure on the chamfered surfaces of bolts 374 and/or notches 354, thereby pushing the bolts 374 radially outward in ports 387. This may improve the speed of the decoupling process.

Once bolts 374 are mated with notches 354 and fixation ring 373 is in a closed position, bi-directional torque may be transferred between the top drive and the tool. For example, torque may be transferred from the motors 140 to the drive gears 130, through the drive gear profiles 185 to the drive stem 380, through the ports 387 to the bolts 374, to the notches 354 of the tool stem 360, and thus to the tool string 2. When tool stem 360 is coupled to drive stem 380, bi-directional torque may be transferred between the top drive and the tool. Likewise, when tool stem 360 is coupled to drive stem 380, central bore 365 may provide fluid communication between the top drive and the tool.

As would be understood by one of ordinary skill in the art with the benefit of this disclosure, drive stem 380 may support the axial load of tool string 2 by coupling to tool stem 360 with coupling system 370. Therefore, the number and sizing of bolts 374 (and, therefore, the number and sizing of notches 354, ports 387, and grooves 344) may be selected to support the expected axial load. The cross-sections of fixation ring 373 in FIG. 15A-15C illustrate a coupling system 370 with four bolts. For the same sizing, an increased number of bolts 374 may be desired to support an increased expected axial load. For the same number, an increased sizing of bolts 374 may be desired to support an increased expected axial load.

It should be understood that actuators 372 cannot move the top of fixation ring 373 above grooves 342 when maintenance pins 341 are extended, as illustrated in FIGS. 14 and 17. It should also be appreciated that bolts 374 cannot fully extend radially outward from ports 387 while the top of fixation ring 373 is at or below grooves 342. Consequently, when maintenance is required (such as replacing bolts 374), maintenance pins 341 may be pushed fully into grooves 342 to allow the top of fixation ring 373 to move above grooves 342. In some embodiments, maintenance pins 341 may be spring-loaded in grooves 342. In some embodiments, maintenance pins 341 may be threaded into grooves 342. This may improve the speed and reliability of maintenance programs for components of top coupling system 370.

Figure 18:
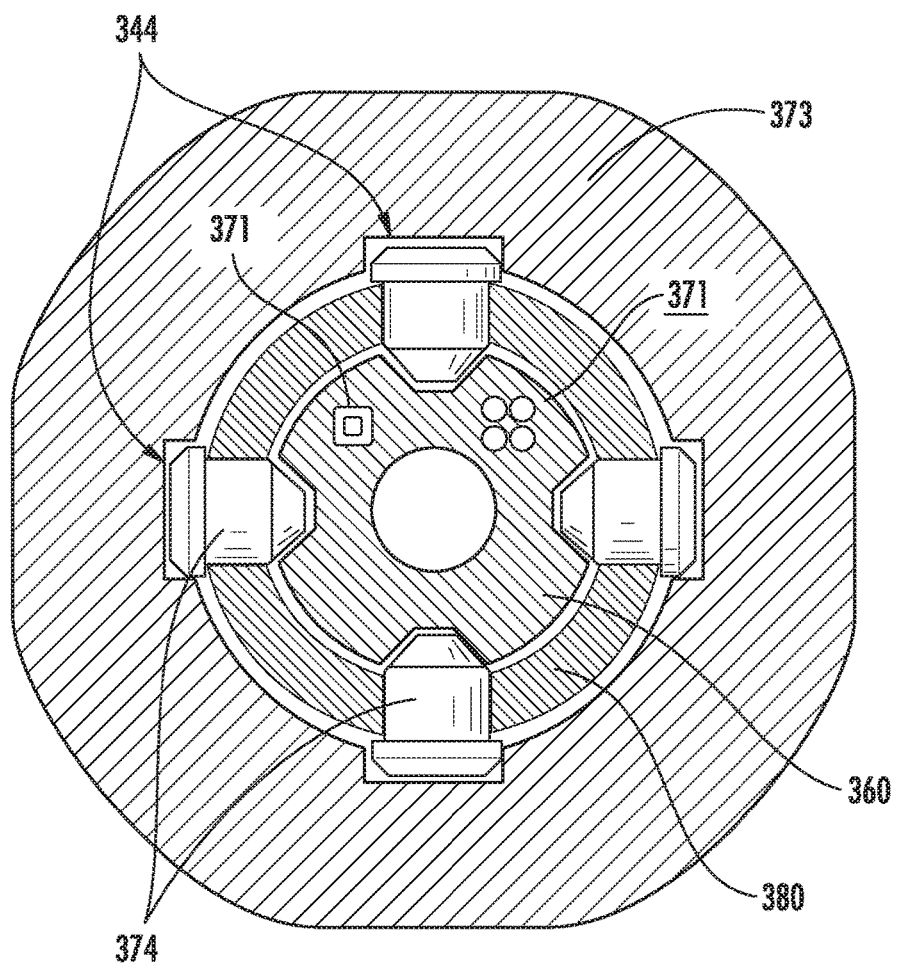
FIG. 18 further illustrates aspects of the coupling system of FIG. 14.

Coupling system 370 may also include auxiliary couplings 371. For example, as illustrated in FIG. 18, auxiliary couplings 371 may include hydraulic couplings, pneumatic couplings, electronic couplings, fiber optic couplings, power couplings, data couplings, and/or signal couplings.

Figure 19:
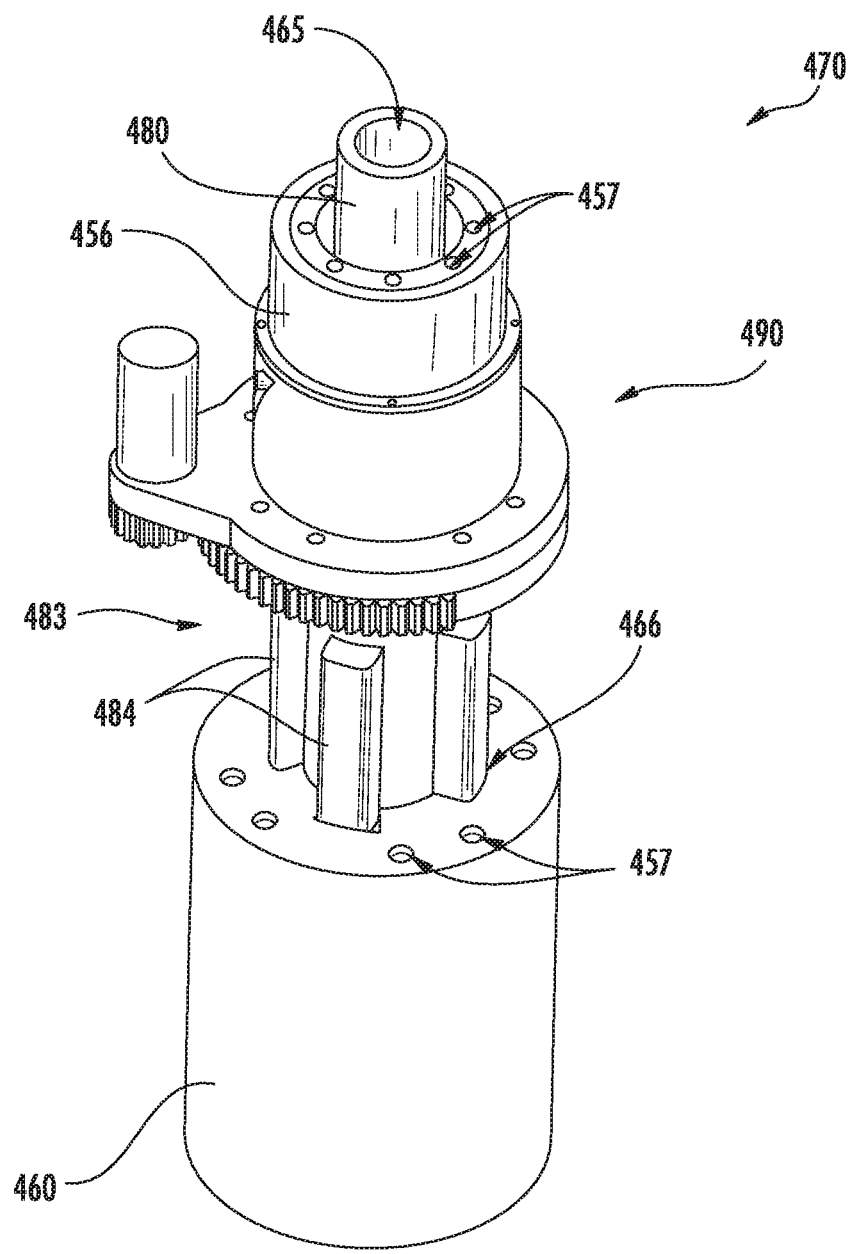
FIG. 19 further illustrates aspects of the coupling system of FIG. 14.

FIG. 19 illustrates an alternative coupling system 470, according to embodiments described herein. Drive unit 110 may include drive stem 480 and blocking mechanism 490 as first portions of coupling system 470, and tool adapter 150 may include tool stem 460 as a second portion of coupling system 470. As with coupling systems 170, 270, and 370, coupling system 470 may couple drive stem 480 with tool stem 460 to create a shared central bore 465 (e.g. providing fluid communication from drive unit 110 to tool adapter 150). Drive stem 480 may have a coupling profile 483. Tool stem 460 may have a coupling recess 466. Coupling recess 466 may be sized to be larger than coupling profile 483 of drive stem 480. When drive unit 110 is coupled to tool adapter 150, coupling profile 483 may be stabbed into and/or surrounded by coupling recess 466.

Coupling profile 483 may be an axially symmetrical or axially non-symmetrical profile capable of conveying load and/or torque around central bore 465. For example, coupling profile 483 may include a plurality (e.g., two, three, four, five, six, etc.) of lugs 484 distributed axially symmetrically around central bore 465. The radial extent of coupling profile 483 may be selected to accommodate manufacturing and operational conditions. For example, a larger radial extent of coupling profile 483 may provide for a larger lever-arm, thereby conveying greater torque at the same rotational speed. As would be understood by one of ordinary skill in the art with the benefit of this disclosure, drive stem 480 may support the axial load of tool string 2 by coupling to tool stem 460 with coupling profile 483. Therefore, the number and sizing of the lugs 484 of coupling profile 483 (and, therefore, of coupling recess 466) may be selected to support the expected axial load. For the same sizing, an increased number of lugs may be desired to support an increased expected axial load. For the same number, an increased sizing of lugs may be desired to support an increased expected axial load.

Figure 20:
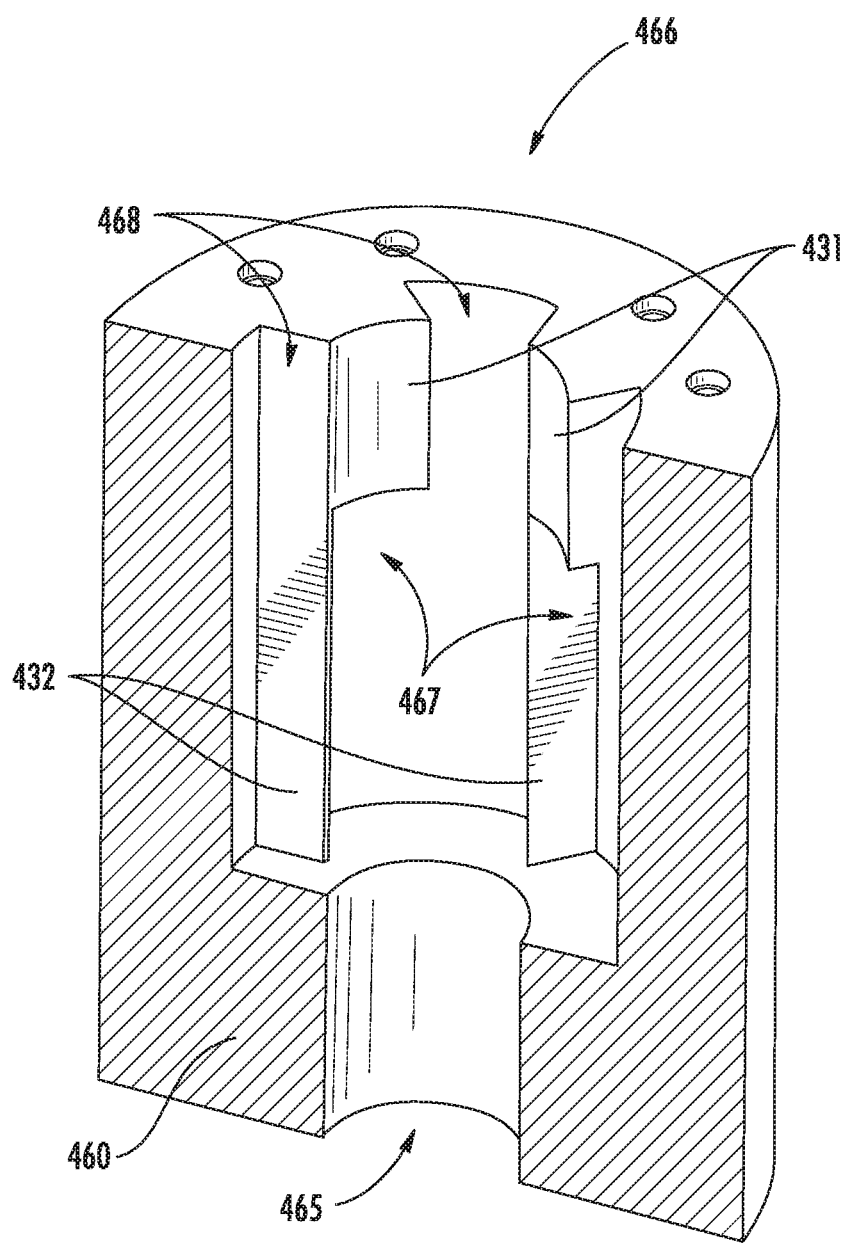
FIG. 20 further illustrates aspects of the coupling system of FIG. 14.

As illustrated in FIG. 20, tool stem 460 may include a coupling recess 466. Coupling recess 466 may be configured to engage and/or mate with coupling profile 483 of drive stem 480. Coupling recess 466 may include an upwards opening on an upper portion of tool stem 460. Coupling recess 466 may be an axially symmetrical or axially non-symmetrical profile capable of conveying axial load and/or torque around central bore 465. For example, coupling recess 466 may include a plurality (e.g., two, three, four, five, six, etc.) of pockets 467 and grooves 468 distributed around central bore 465. Pockets 467 and/or grooves 468 may be complementary to lugs 484. Pockets 467 and grooves 468 may be interleaved around central bore 465. Pockets 467 and/or grooves 468 may be primarily vertical features. Pockets 467 and/or grooves 468 may be at least as wide as lugs 484. Each pocket 467 may be separated from an adjacent groove 468 on one side by a divider 432. A shoulder 431 may be disposed between each pocket 467 and the top of tool stem 460. Shoulders 431 may include horizontal surfaces complementary to shoulders of lugs 484. Pockets 467 may be at least as deep as the height of lugs 484. Grooves 468 may be at least as deep as the height of lugs 484 plus the height of shoulders 431. Grooves 468 may be sized and located so that each lug 484 may pass from a groove 468 to a pocket 467 in coupling recess 466. In some embodiments, the coupling recess 466 may have a radial extent at least as wide as coupling profile 483. Coupling recess 466 may engage coupling profile 483 when drive stem 480 is stabbed into tool stem 460 to couple drive unit 110 to tool adapter 150. For example, drive stem 480 may turn coupling profile 483, which engages coupling recess 466, thereby turning tool stem 460 of tool adapter 150.

Figures 21A, 21B:
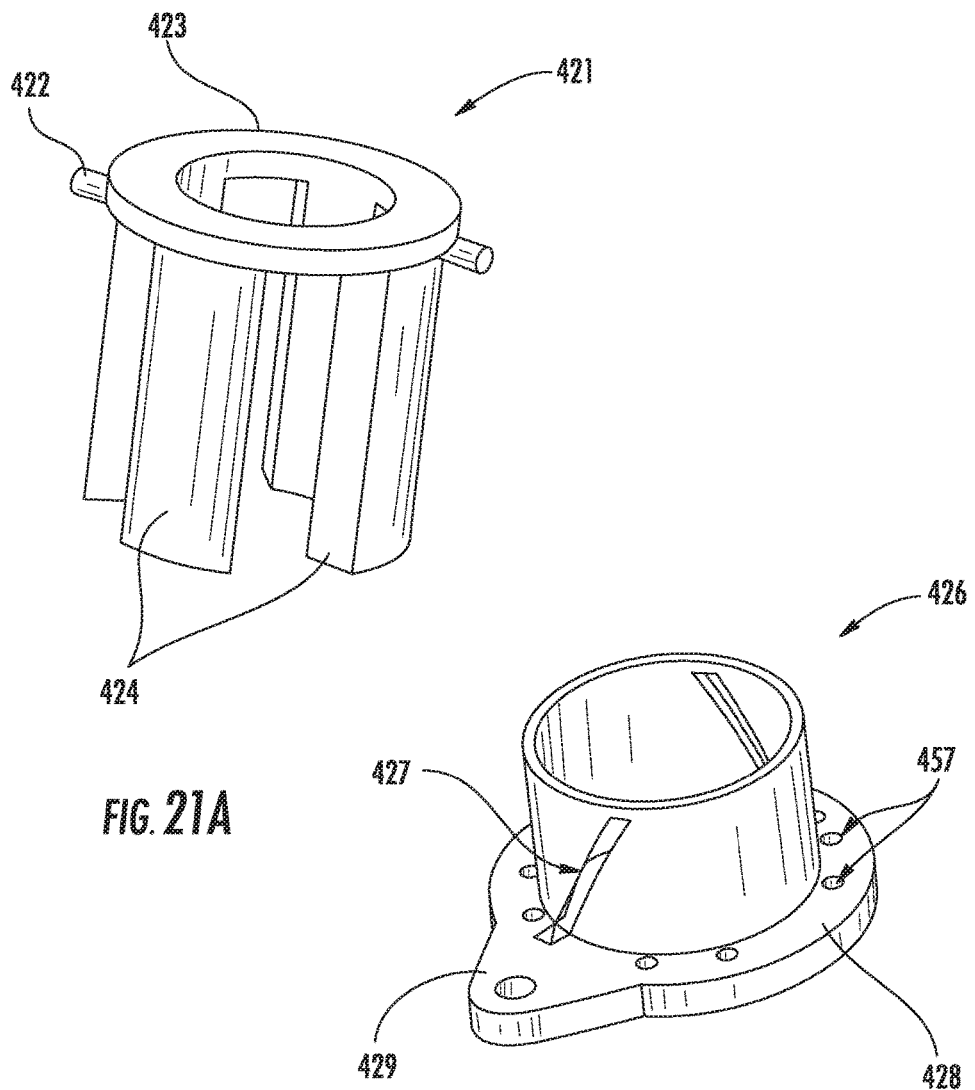
FIGS. 21A-21B further illustrate aspects of the coupling system of FIG. 14.

Blocking mechanism 490 of drive unit 110 may include a blocking insert 421, as illustrated in FIG. 21A. Blocking insert 421 may include a plurality of blocking lugs 424. The number, size, and distribution of blocking lugs 424 on blocking insert 421 may be similar to the number, size, and distribution of lugs 484 on coupling profile 483. For example, blocking lugs 424 may have the same width as lugs 484. Consequently, blocking lugs 424 may be complementary to grooves 468 of coupling recess 466. In some embodiments, blocking lugs 424 may have a larger height than lugs 484. Blocking insert 421 may include a plate 423 to maintain the relative positions of blocking lugs 424. Blocking lugs 424 may extend perpendicularly from plate 423. Plate 423 may be an annulus. Blocking insert 421 may include one or more connecting pins 422. In some embodiments, connecting pins 422 extend radially outward from plate 423. Blocking mechanism 490 may also include a cap 426, as illustrated in FIG. 21B. Cap 426 may be generally cylindrical, having an inner diameter at least as large as the outer diameter of blocking insert 421. Consequently, plate 423 of blocking insert 421 may fit inside the cylinder of cap 426. Cap 426 may have one or more grooves 427. Grooves 427 may be configured to receive connecting pins 422. Grooves 427 may extend downwardly and circumferentially from the top of cap 426 or near the top of cap 426. Grooves 427 may reach the bottom or near the bottom of cap 426. Grooves 427 may form a helix on the cylinder of cap 426. In the illustrated embodiment, grooves 427 extend through the side of the cylinder of cap 426. In some embodiments, grooves 427 are cut into the inner surface of the cylinder of cap 426 without extending through the side. When blocking insert 421 is disposed in cap 426 such that connecting pins 422 are disposed in grooves 427, vertical motion of blocking insert 421 relative to cap 426 results in rotational motion of blocking insert 421 relative to cap 426 due to the motion of connecting pins 422 in grooves 427. Likewise, rotational motion of blocking insert 421 relative to cap 426 results in vertical motion of blocking insert 421, and thereby blocking lugs 424, relative to cap 426. Cap 426 may also have a rim 428 near the bottom of cap 426. Rim 428 may have a stage 429 extending from one side of cap 426.

Figure 22:
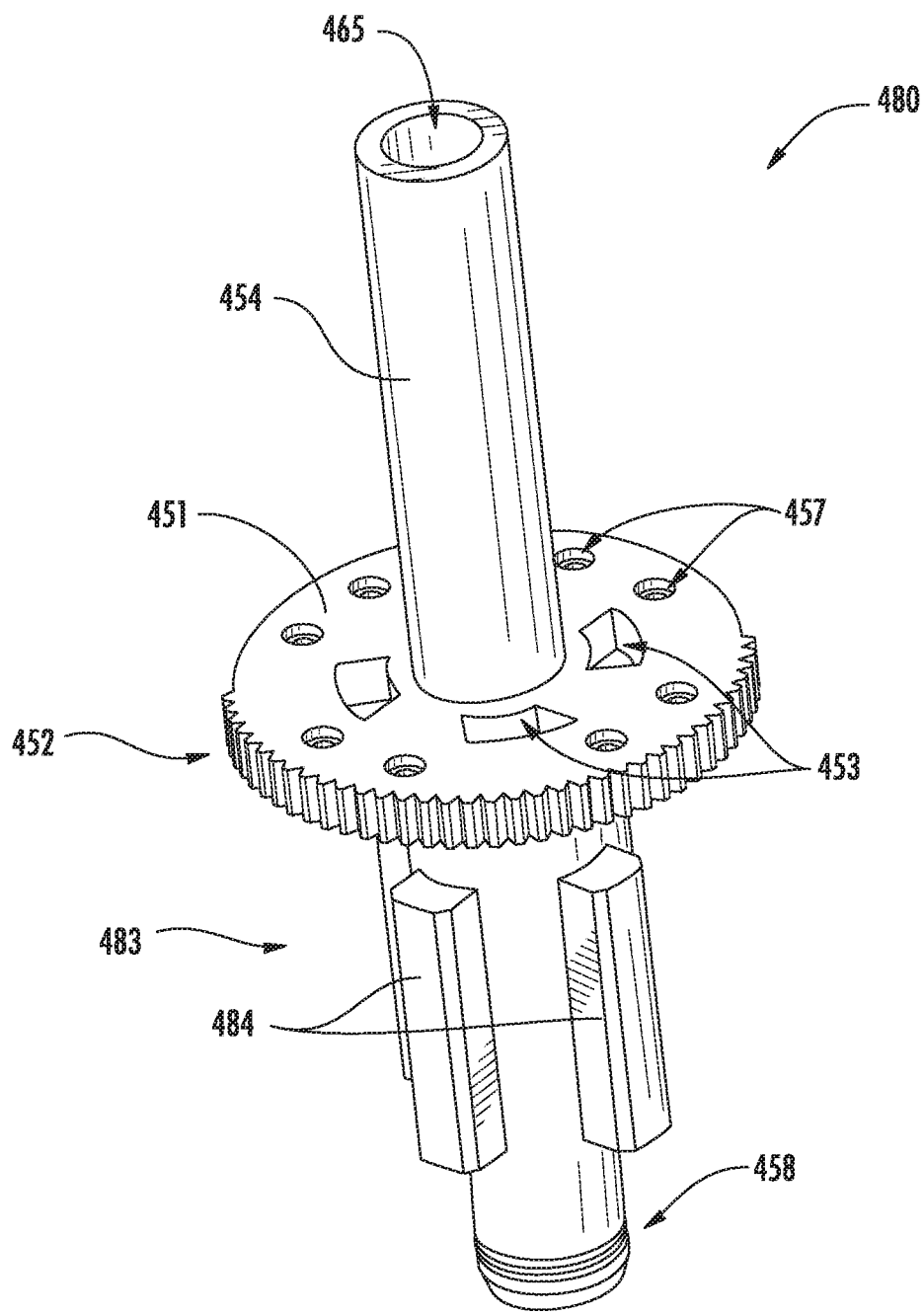
FIG. 22 further illustrates aspects of the coupling system of FIG. 14.

FIG. 22 further illustrates features of drive stem 480 and blocking mechanism 490. In some embodiments, drive stem 480 includes a mandrel 454 that is sized to insert into and through blocking insert 421. For example, when plate 423 is an annulus, plate 423 may be disposed around mandrel 454 during operations. Blocking insert 421 may thereby move vertically relative to mandrel 454 and drive stem 480. In some embodiments, drive stem 480 includes a blocking gear 451 between the mandrel 454 and the lugs 484. The blocking gear 451 may have lug holes 453. The lug holes 453 may have a width complementary to blocking lugs 424. Blocking gear 451 may be a generally flat structure that is generally perpendicular to mandrel 454. Lug holes 453 may be similar in number, size, and distribution as grooves 468 of coupling recess 466. When plate 423 of blocking insert 421 is disposed around mandrel 454, blocking lugs 424 may insert into and through lug holes 453. During operations, cap 426 of blocking mechanism 490 may be vertically fixed to blocking gear 451 of drive stem 480, but cap 426 may be able to rotate relative to blocking gear 451. During operations, blocking insert 421 of blocking mechanism 490 may be rotationally fixed to blocking gear 451 of drive stem 480, but blocking insert 421 may be able to move vertically relative to blocking gear 451. Consequently, rotational motion of drive stem 480 relative to cap 426 results in vertical motion of blocking insert 421, and thereby blocking lugs 424, relative to blocking gear 451. Coupling system 470 may said to be in an "open" position when drive stem 480 is rotated relative to cap 426 such that blocking insert 421 is at or near the top of cap 426, and blocking lugs 424 are thereby raised and/or retracted. Coupling system 470 may said to be in an "closed" position when drive stem 480 is rotated relative to cap 426 such that blocking insert 421 is at or near the bottom of cap 426, and blocking lugs 424 are thereby lowered and/or extended. Blocking gear 451 may also have a gear profile 452 (e.g., teeth) disposed on an external (radially outward) surface thereof. The gear profile 452 may be on a portion or the entirety of the circumference of blocking gear 451.

Figure 23:
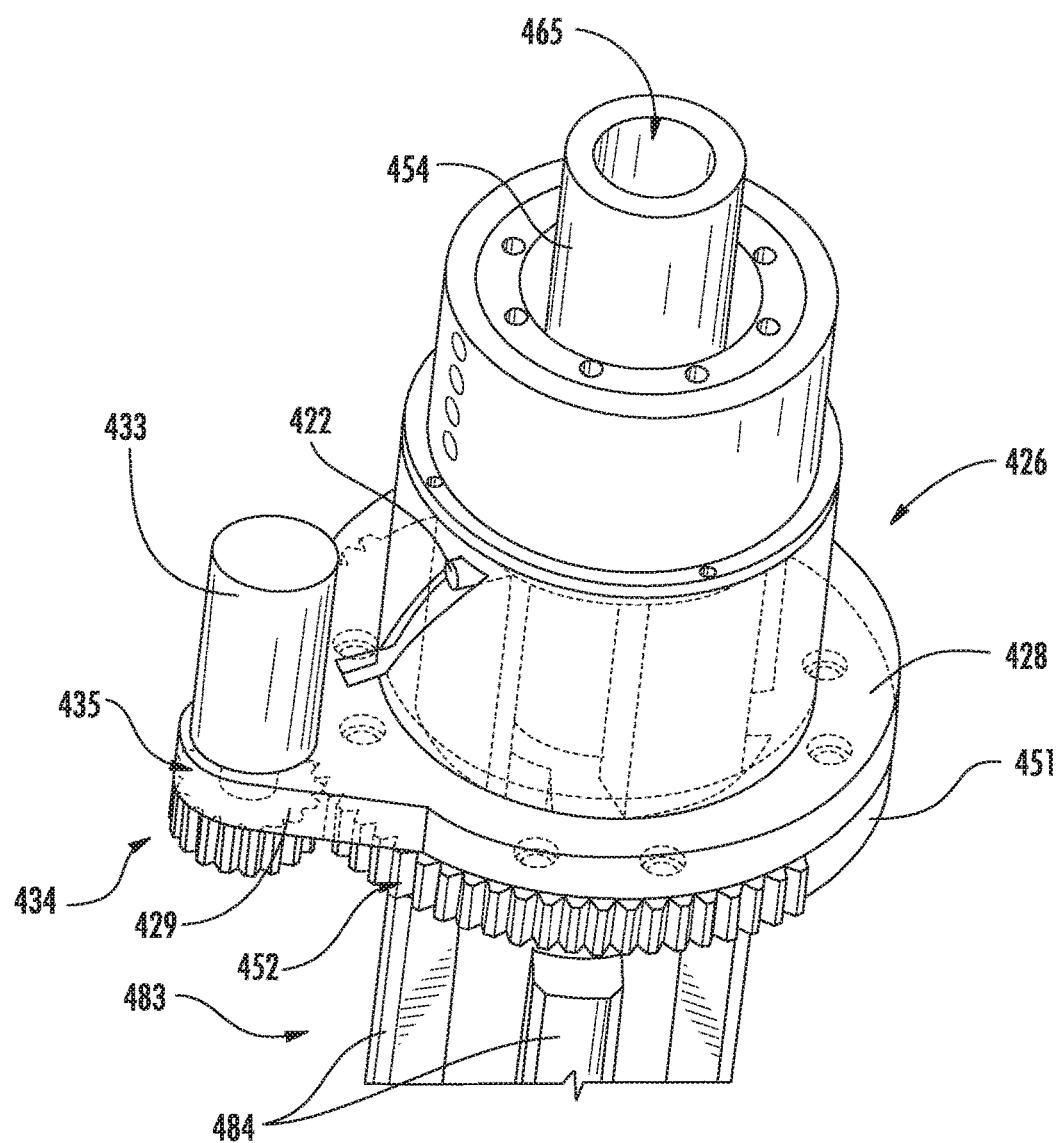
FIG. 23 further illustrates aspects of the coupling system of FIG. 14.

FIG. 23 further illustrates features of drive stem 480 and blocking mechanism 490. In some embodiments, blocking mechanism 490 includes a blocking actuator 433 coupled to a gear profile 434 by a shaft 435. For example, the blocking actuator 433 may be manual, hydraulic, pneumatic, electrical, etc. Shaft 435 may run through stage 429 of cap 426. Shaft 435 and/or gear profile 434 may thereby turn relative to stage 429. Gear profile 434 may engage gear profile 452 of blocking gear 451. For example, gear profile 434 may have teeth designed to mesh with the gearing of gear profile 452. Alternatively, gear profile 434 and/or gear profile 452 may be configured to engage belt drive, chain drive, or other systems that are capable of conveying rotation. Blocking actuator 433 may drive gear profile 434 to turn relative to stage 429 of cap 426. Gear profile 434 may then engage gear profile 452 to turn relative to cap 426. Gear profile 452 may thereby turn blocking gear 451 and drive stem 480 relative to cap 426. Consequently, blocking actuator 433 may rotate drive stem 480 relative to cap 426, thereby causing vertical motion of blocking lugs 424 relative to blocking gear 451. It should be appreciated that other configurations of actuators, gear profiles, blocking gears, caps, and/or blocking inserts may be considered to accommodate manufacturing and operational conditions.

Coupling of drive unit 110 to tool adapter 150 may proceed as a multi-step process. In one embodiment, the coupling begins with axial load coupling between drive stem 480 and tool stem 460. Tool stem 460 may be oriented below drive stem 480 so that coupling recess 466 aligns with coupling profile 483. For example, tool stem 460 may be oriented relative to coupling recess 466 so that lugs 484 align with grooves 468. Drive stem 480 and/or coupling profile 483 may be stabbed into coupling recess 466, as illustrated in FIG. 19. The lugs 484 and/or the grooves 468 may have guiding chamfers to assist with alignment. Tool stem 460 may be raised relative to drive stem 480 (and/or drive stem 480 may be lowered relative to tool stem 460) so that lugs 484 fully mate with and/or engages grooves 468. Once lugs 484 are fully mated with grooves 468, tool stem 460 may be rotated relative to drive stem 480 so that each lug 484 may pass from a groove 468 to a pocket 467 in coupling recess 466. Rotation of tool stem 460 relative to drive stem 480 may stop when lugs 484 contact dividers 432. Lugs 484 may thereby be located underneath shoulders 431 in pockets 467 of tool stem 460. When lugs 484 are in pockets 467, axial load may be transferred from tool stem 460 through shoulders 431, to lugs 484, to drive stem 480, and thereby to drive unit 110.

Coupling of drive unit 110 to tool adapter 150 may proceed with bi-directional torque coupling between drive stem 480 and tool stem 460. With coupling profile 483 stabbed into coupling recess 466, and with lugs 484 rotated into pockets 467, blocking mechanism 490 may rotationally fix drive stem 480 with tool stem 460. For example, blocking actuator 433 may cause drive stem 480 to rotate relative to cap 426, thereby causing vertical motion of blocking lugs 424 relative to blocking gear 451. Blocking lugs 424 may move downwards through lug holes 453 of blocking gear 451 and into grooves 468 of coupling recess 466. Blocking lugs 424 may thereby occupy grooves 468, trapping lugs 484 of drive stem 480 in pockets 467 of tool stem 460. In some embodiments, a locking feature may secure blocking lugs 424 in grooves 468. In some embodiments, the locking feature may secure blocking actuator 433. When blocking lugs 424 are in grooves 468, bi-directional torque may be transferred from drive unit 110 to drive stem 480, through lugs 484 to dividers 432 (either directly or indirectly through blocking lugs 424), to tool stem 460, and thereby to tool adapter 150.

In some embodiments, coupling drive stem 480 to tool stem 460 may be facilitated with various sensors, actuators, couplers, and/or adapters. For example, as illustrated in FIG. 19, coupling system 470 may include a swivel 456 encircling drive stem 480. A first portion of swivel 456 may be fixed to drive unit 110 (e.g., fixed to a housing of drive unit 110), and a second portion of swivel 456 may be fixed to cap 426. The first portion of swivel 456 may rotate relative to the second portion of swivel 456. In some embodiments, swivel 456 may have one or more ports 457 to provide coupling paths for auxiliary couplings (e.g., hydraulic couplings, pneumatic couplings, electronic couplings, fiber optic couplings, power couplings, data couplings, and/or signal couplings). Also illustrated in FIG. 19, tool stem 460 may have one or more ports 457 to provide coupling paths for auxiliary couplings. As another example, illustrated in FIG. 21B, cap 426 may have one or more ports 457 from the top surface to the bottom surface of rim 428. The ports 457 may provide coupling paths for auxiliary couplings. Likewise, as illustrated in FIG. 22, blocking gear 451 may have one or more ports 457 from the top surface to the bottom surface of blocking gear 451. The ports 457 may provide coupling paths for auxiliary couplings. The various ports 457 may provide auxiliary couplings from the drive unit 110 to the tool adapter 150. In some embodiments, there may be face seals between each section. When the drive stem 480 is in the open position, drive stem 480 may act as a gate valve for the auxiliary couplings, preventing flow and/or leaks. When the drive unit 110 is coupled to the tool adapter 150, such that drive stem 480 is in the closed position, the auxiliary couplings may allow for normal flow. Also illustrated in FIG. 22, O-rings 458 may be disposed on drive stem 480 below lugs 484. The O-rings 458 may secure the fluid connection through central bore 465 between drive stem 480 and tool stem 460.

It should be appreciated that, for each coupling system 170, 270, 370, 470, a variety of sensors, actuators, and/or adapters types and/or configurations may be considered to accommodate manufacturing and operational conditions. The actuators may be, for example, worm drives, hydraulic cylinders, compensation cylinders, etc. The actuators may be hydraulically, pneumatically, electrically, and/or manually controlled. In some embodiments, multiple control mechanism may be utilized to provide redundancy. One or more sensors may be used to monitor relative positions of the components of the top drive system. The sensors may be position sensors, rotation sensors, pressure sensors, optical sensors, magnetic sensors, etc. In some embodiments, stop surfaces may be used in conjunction with or in lieu of sensors to identify when components are appropriately positioned and/or oriented. Likewise, optical guides may be utilized to identify or confirm when components are appropriately positioned and/or oriented. In some embodiments, guide elements (e.g., pins and holes, chamfers, etc.) may assist in aligning and/or orienting the components of each coupling system 170, 270, 370, 470. Bearings and seals may be disposed between components to provide support, cushioning, rotational freedom, and/or fluid management.

In an embodiment a coupling system of a top drive system includes a first plate comprising a stabbing member that is perpendicular to the first plate; and a second plate comprising: a hollow complementary to the stabbing member; a bore in the second plate; a bar that is rotatable within the bore between an open position and a closed position; and a securing member that secures the stabbing member in the hollow when the first plate is joined to the second plate and the bar is in the closed position.

In one or more embodiments disclosed herein, the coupling system also includes a central shaft through the first plate and the second plate when the first plate is joined to the second plate.

In one or more embodiments disclosed herein, the first plate is fixed to a drive unit of the top drive system.

In one or more embodiments disclosed herein, the stabbing member is a docking sleeve having a central bore, the coupling system further comprising an auxiliary coupling at least partially disposed in the central bore.

In one or more embodiments disclosed herein, the hollow comprises a docking recess complementary to the docking sleeve; and the bore traverses the docking recess.

In one or more embodiments disclosed herein, the bar comprises a coupling recess, a dimension of which matches the docking recess.

In one or more embodiments disclosed herein, the docking sleeve comprises a notch on an external surface; the bar is disposed in the notch when the first plate is joined to the second plate and the bar is in the closed position; and the coupling recess is disposed in the notch when the first plate is joined to the second plate and the bar is in the open position.

In one or more embodiments disclosed herein, the stabbing member is a key plate, the coupling system further comprising: a docking sleeve having a central bore; and an auxiliary coupling at least partially disposed in the central bore.

In one or more embodiments disclosed herein, the first plate comprises the docking sleeve, and the second plate comprises a docking recess complementary to the docking sleeve.

In one or more embodiments disclosed herein, the hollow comprises a cavity complementary to the key plate; and the second plate comprises: a pocket adjacent to the cavity; and a key at least partially disposed in the pocket.

In one or more embodiments disclosed herein, the key is at least partially disposed in a key hole of the key plate when the first plate is joined to the second plate and the bar is in the closed position.

In one or more embodiments disclosed herein, the bar comprises a pin, and the key comprises a pin hole that is complementary to the pin.

In an embodiment a method of coupling a drive unit to a tool adapter includes joining a first plate to a second plate; stabbing a stabbing member of the first plate into a hollow of the second plate; and rotating a bar in a bore of the second plate from an open position to a closed position to secure the stabbing member in the hollow.

In one or more embodiments disclosed herein, the drive unit is fixed to the first plate.

In one or more embodiments disclosed herein, the method also includes plugging a plug of an auxiliary coupling into a socket of the auxiliary coupling.

In one or more embodiments disclosed herein, the plug is at least partially disposed in a docking sleeve.

In one or more embodiments disclosed herein, the first plate comprises the docking sleeve.

In one or more embodiments disclosed herein, the stabbing member is a key plate, the method further comprising sliding a key in a pocket of the second plate into a key hole of a key plate of the first plate.

In one or more embodiments disclosed herein, the method also includes transferring load from the tool adapter to the drive unit.

In one or more embodiments disclosed herein, the method also includes, before joining the first plate to the second plate, removing a cover from the second plate.

In an embodiment a coupling system includes a drive unit comprising: a drive stem having a coupling recess; a plurality of bolts in ports of the drive stem, wherein the bolts can move radially relative to a central bore of the drive stem; and a fixation ring encircling the drive stem and in contact with exterior ends of the bolts, wherein the fixation ring can move vertically relative to the drive stem; and a tool adapter comprising a coupling head having at least as many notches as the bolts.

In one or more embodiments disclosed herein, the ports extend from an exterior of the drive stem to the coupling recess.

In one or more embodiments disclosed herein, when the fixation ring is in an open position, the tool adapter can stab into the coupling recess; and when the fixation ring is in a closed position and the tool adapter is stabbed into the coupling recess, the bolts are secured in the notches.

In one or more embodiments disclosed herein, when the tool adapter is stabbed into the coupling recess, the ports align with the notches.

In one or more embodiments disclosed herein, the fixation ring has an inner contour comprising: an upper maximum inner diameter; and a lower maximum inner diameter that is greater than the upper maximum inner diameter.

In one or more embodiments disclosed herein, an endpoint of the lower maximum inner diameters is in a groove of the inner contour.

In one or more embodiments disclosed herein, the coupling head has a crown; and the coupling recess has a guide complementary to the crown.

In one or more embodiments disclosed herein, the coupling system also includes actuators configured to move the fixation ring vertically relative to the drive stem.

In one or more embodiments disclosed herein, the drive stem further comprises maintenance pins and grooves proximate an end of a stroke of the actuators.

In one or more embodiments disclosed herein, the coupling system also includes a load coupling comprising engagement of the bolts with the notches.

In one or more embodiments disclosed herein, the coupling system also includes a torque coupling comprising engagement of the bolts with the notches.

In an embodiment a method of coupling a drive unit to a tool adapter includes positioning the tool adapter below the drive unit; stabbing a coupling head of the tool adapter into a coupling recess of a drive stem of the drive unit; moving a fixation ring vertically relative to the drive stem; and securing bolts of the drive unit in notches of the coupling head.

In one or more embodiments disclosed herein, the method also includes coupling a torque between the drive unit and the tool adapter by securing the bolts in the notches; and coupling a load between the drive unit and the tool adapter by securing the bolts in the notches.

In one or more embodiments disclosed herein, moving the fixation ring vertically downwards moves the bolts radially inwards.

In one or more embodiments disclosed herein, stabbing the coupling head into the coupling recess comprises engaging a crown of the coupling head with a guide of the coupling recess.

In one or more embodiments disclosed herein, engaging the crown of the coupling head with the guide of the coupling recess rotates the coupling head relative to the drive stem.

In one or more embodiments disclosed herein, ports extend from an exterior of the drive stem to the coupling recess; and rotating the coupling head relative to the drive stem aligns the ports with the notches.

In one or more embodiments disclosed herein, the method also includes forming an auxiliary coupling between the drive unit and the tool adapter, wherein the auxiliary coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

In an embodiment a coupling system between a drive unit and a tool adapter includes a coupling profile; a coupling recess complementary to the coupling profile, wherein engagement of the coupling profile with the coupling recess transfers axial load between the drive unit and the tool adapter; and a blocking mechanism, wherein engagement of the blocking mechanism with the coupling profile and the coupling recess transfers bi-directional torque between the drive unit and the tool adapter.

In one or more embodiments disclosed herein, the drive unit comprises the coupling profile; and the tool adapter comprises the coupling recess.

In one or more embodiments disclosed herein, the coupling profile comprises lugs; the coupling recess comprises grooves that are complementary to the lugs; and the blocking mechanism comprises blocking lugs that are complementary to the grooves.

In one or more embodiments disclosed herein, the coupling recess further comprises pockets that are complementary to the lugs.

In one or more embodiments disclosed herein, engagement of the coupling profile with the coupling recess to transfer axial load comprises disposing the lugs in the pockets.

In one or more embodiments disclosed herein, engagement of the blocking mechanism with the coupling profile and the coupling recess to transfer bi-directional torque comprises disposing the blocking lugs in the grooves.

In one or more embodiments disclosed herein, the blocking mechanism comprises: a blocking insert comprising an annular plate; one or more connecting pins extending radially from the annular plate; and a plurality of blocking lugs extending perpendicularly from the annular plate; and a cap comprising: a cylindrical housing, wherein the annular plate fits inside the cylindrical housing; grooves in the cylindrical housing, wherein the grooves are complementary to the connecting pins and extend both axially and circumferentially on the cylindrical housing; and a rim having a stage on one side of the cap.

In one or more embodiments disclosed herein, the grooves form a helix on the cylindrical housing.

In one or more embodiments disclosed herein, the blocking mechanism further comprises: a blocking actuator; and a gear profile functionally connected to the blocking actuator and rotatable relative to the stage.

In one or more embodiments disclosed herein, the coupling profile comprises a drive stem comprising: a blocking gear having a gear profile that is complementary to the gear profile of the blocking mechanism; and lugs that are similar in number, size, and distribution to the blocking lugs.

In one or more embodiments disclosed herein, the coupling recess comprises lug grooves; and the blocking gear has lug holes that are similar in number, size, and distribution to the lug grooves.

In one or more embodiments disclosed herein, the coupling profile comprises lugs; the coupling recess comprises pockets and grooves complimentary to the lugs; the blocking mechanism comprises blocking lugs complimentary to the grooves; the coupling system can be in a first position wherein the lugs are in the grooves; and the coupling system can be in a second position wherein the lugs are in the pockets and the blocking lugs are in the grooves.

In an embodiment a method of coupling a drive unit to a tool adapter includes stabbing a coupling profile into a coupling recess; rotating the coupling profile relative to the coupling recess in a first direction to form a load coupling; and after forming the load coupling, blocking rotation of the coupling profile relative to the coupling recess in a direction opposite the first direction to form a torque coupling.

In one or more embodiments disclosed herein, the drive unit comprises the coupling profile; and the tool adapter comprises the coupling recess.

In one or more embodiments disclosed herein, the coupling profile comprises lugs; the coupling recess comprises grooves that are complementary to the lugs; and the blocking the rotation of the coupling profile comprises disposing blocking lugs in the grooves.

In one or more embodiments disclosed herein, the coupling recess further comprises pockets that are complementary to the lugs; and the rotating the coupling profile comprises disposing the lugs in the pockets.

In one or more embodiments disclosed herein, the method also includes maintaining the blocking lugs in a retracted position while stabbing the coupling profile into the coupling recess.

In one or more embodiments disclosed herein, the blocking the rotation of the coupling profile comprises moving the blocking lugs to an extended position.

In one or more embodiments disclosed herein, the coupling profile comprises a drive stem comprising a blocking gear; the method further comprises rotating the drive stem relative to a blocking cap to extend blocking lugs through the blocking gear.

In one or more embodiments disclosed herein, the method also includes actuating a gear profile to rotate the drive stem.

In one or more embodiments disclosed herein, the blocking cap is vertically fixed to the blocking gear while the drive stem rotates relative to the blocking cap.

In one or more embodiments disclosed herein, the method also includes forming a coupling between the drive unit and the tool adapter, wherein the coupling is selected from a group consisting of: threaded couplings, hydraulic couplings, pneumatic couplings, electronic couplings, fiber optic couplings, power couplings, data couplings, signal couplings, bi-directional torque couplings, axial load couplings, power couplings, data couplings, and signal couplings.

While the foregoing is directed to embodiments of the present invention, other and further embodiments of the invention may be devised without departing from the basic scope thereof, and the scope thereof is determined by the claims that follow.

The invention claimed is:

1. A coupling system of a top drive system comprising:
a first plate having a stabbing member that is perpendicular to the first plate, wherein the first plate includes a central bore:
a drive stem at least partially disposed in the central bore, wherein the drive stem is rotatable relative to the first plate; and a second plate having:
a hollow complementary to the stabbing member; a bar bore in the second plate; and
a bar that is rotatable within the bar bore between an open position and a closed position;
wherein the stabbing member is secured in the hollow when the first plate is joined to the second plate and the bar is in the closed position.

2. The coupling system of claim 1, wherein the stabbing member is a docking sleeve having a docking sleeve bore, the coupling system further comprising an auxiliary coupling at least partially disposed in the docking sleeve bore.

3. The coupling system of claim 2, wherein:
the hollow comprises a docking recess complementary to the docking sleeve;
the bar bore traverses the docking recess;
the bar comprises a coupling recess, a dimension of which matches the docking recess;
the docking sleeve comprises a notch on an external surface;

the bar is disposed in the notch when the first plate is joined to the second plate and the bar is in the closed position, thereby securing the stabbing member in the hollow; and the coupling recess is disposed in the notch when the first plate is joined to the second plate and the bar is in the open position.

4. The coupling system of claim 1, wherein the stabbing member is a key plate, the coupling system further comprising:
a docking sleeve having a docking sleeve bore; and
an auxiliary coupling at least partially disposed in the docking sleeve bore.

5. The coupling system of claim 4, wherein:
the first plate comprises the docking sleeve;
the second plate comprises a docking recess complementary to the docking sleeve;
the hollow comprises a cavity complementary to the key plate;
the second plate comprises:
a pocket adjacent to the cavity; and
a key at least partially disposed in the pocket; and
the key is at least partially disposed in a key hole of the key plate when the first plate is joined to the second plate and the bar is in the closed position, thereby securing the key plate in the cavity.

6. The coupling system of claim 1, further comprising:
a tool stem rotatable relative to the second plate.

7. The coupling system of claim 6, wherein the drive stem includes a first flow bore and the tool stem includes a second flow bore.

8. The coupling system of claim 6, further comprising:
a tool string coupled to the tool stem, wherein the first flow bore and the second flow bore are configured to allow fluid communication between the top drive system and the tool string.

9. The coupling system of claim 2, wherein the auxiliary coupling comprising at least one selected from the group of:
a hydraulic coupling;
a pneumatic coupling;
an electronic coupling;
a fiber optic coupling;
a power coupling;
a data coupling; and
a signal coupling.

10. The coupling system of claim 2, wherein the auxiliary coupling includes:
a supply line disposed in the docking sleeve bore;
a socket disposed in the docking sleeve bore and attached to the supply line;
a plug disposed in the hollow; and
a delivery line disposed in the in the second plate.

11. A coupling system of a top drive system comprising:
a first plate having a stabbing member that is perpendicular to the first plate, wherein the stabbing member includes a notch; and a second plate having:
a hollow complementary to the stabbing member; a bar bore in the second plate; and a bar having a coupling recess, wherein the bar is rotatable within the bar bore between an open position and a closed position, wherein at least a first majority of the coupling recess is disposed in the hollow when in the open position, and wherein at least a second majority of the coupling recess is disposed in the bar bore in the closed position;

wherein the stabbing member is secured in the hollow when the first plate is joined to the second plate and the bar is in the closed position.

12. The coupling system of claim 11, wherein the stabbing member is a docking sleeve having a docking sleeve bore, the coupling system further comprising an auxiliary coupling at least partially disposed in the docking sleeve bore.

13. The coupling system of claim 12, wherein:
the hollow comprises a docking recess complementary to the docking sleeve;
the bar bore traverses the docking recess;
the coupling recess is disposed in the notch when the first plate is joined to the second plate and the bar is in the open position.

14. The coupling system of claim 12, wherein the auxiliary coupling comprising at least one selected from the group of:
a hydraulic coupling;
a pneumatic coupling;
an electronic coupling;
a fiber optic coupling;
a power coupling;
a data coupling; and
a signal coupling.

15. The coupling system of claim 12, wherein the auxiliary coupling includes:
a supply line disposed in the docking sleeve bore;
a socket disposed in the docking sleeve bore and attached to the supply line;
a plug disposed in the hollow; and
a delivery line disposed in the in the second plate.

16. The coupling system of claim 11, further comprising:
a drive stem at least disposed in a central bore of the first plate and rotatable relative to the first plate; and
a tool stem rotatable relative to the second plate.

17. The coupling system of claim 16, further comprising:
a first flow bore of the drive stem;
a second flow bore of the tool stem; and
a tool string coupled to the tool stem, wherein the first flow bore and second flow bore are configured to allow fluid communication between the top drive system and the tool string.

18. A coupling system of a top drive system comprising:
a first plate having a stabbing member that is perpendicular to the first plate, wherein the stabbing member includes a notch; and
a second plate having:
a hollow complementary to the stabbing member;
a bar bore in the second plate; and
a bar rotatable within the bar bore between an open position and a closed position, wherein the bar is not disposed in the hollow when in the open position, and wherein the bar is at least partially disposed in the hollow in the closed position;
wherein the stabbing member is secured in the hollow when the first plate is joined to the second plate and the bar is in the closed position.

19. The coupling system of claim 18, wherein the stabbing member is a docking sleeve having a docking sleeve bore, the coupling system further comprising an auxiliary coupling at least partially disposed in the docking sleeve bore.

* * * * *